(12) United States Patent
Gordon et al.

(10) Patent No.: US 7,433,695 B2
(45) Date of Patent: Oct. 7, 2008

(54) COMPUTATIONALLY-EFFICIENT ESTIMATION OF THE LOCATION OF A WIRELESS TERMINAL BASED ON PATTERN MATCHING

(75) Inventors: Scot Douglas Gordon, Bothell, WA (US); Robert Lewis Martin, Antioch, CA (US); David Stevenson Spain, Jr., Portola Valley, CA (US)

(73) Assignee: Polaris Wireless, Inc., Santa Clara, CA (US)

( * ) Notice: Subject to any disclaimer, the term of this patent is extended or adjusted under 35 U.S.C. 154(b) by 0 days.

(21) Appl. No.: 11/419,652

(22) Filed: May 22, 2006

(65) Prior Publication Data
US 2006/0240844 A1    Oct. 26, 2006

Related U.S. Application Data

(63) Continuation-in-part of application No. 11/194,151, filed on Aug. 1, 2005, which is a continuation of application No. 10/299,398, filed on Nov. 18, 2002, now Pat. No. 6,944,465.

(60) Provisional application No. 60/757,066, filed on Jan. 6, 2006.

(51) Int. Cl.
*H04Q 7/20* (2006.01)
(52) U.S. Cl. .............. 455/456.1; 455/404.2; 455/456.2; 455/456.6; 455/457; 455/421
(58) Field of Classification Search ............... 455/456.1, 455/404.2, 456.2, 456.3, 456.5, 456.6, 457
See application file for complete search history.

(56) References Cited

U.S. PATENT DOCUMENTS 5,404,376 A    4/1995    Dent (Continued)

FOREIGN PATENT DOCUMENTS

WO    WO 98/15149 A1    4/1998

(Continued)

OTHER PUBLICATIONS

Ingo Gaspard et al., Position Assignment in Digital Cellular Mobile Radio Networks (e.g., GSM) Derived from Measurements at the Protocol Interface, IEEE 1997, pp. 592-596.

(Continued)

*Primary Examiner*—Duc Nguyen
*Assistant Examiner*—Huy Phan
(74) *Attorney, Agent, or Firm*—DeMont & Breyer LLC

(57) ABSTRACT

A method of using a non-GPS-derived technique to estimate the location of an Assisted-GPS-enabled wireless terminal for the purposes of generating location-specific assistance data for the wireless terminal is disclosed. The wireless terminal then uses the assistance data to acquire and process one or more GPS signals and to derive information that is probative of the wireless terminal's location. The GPS-derived location information is then combined with non-GPS-derived location to form an estimate of the location of the wireless terminal that is better than can be derived from either alone. This combination of GPS-derived and non-GPS techniques is particularly useful when the wireless terminal can only acquire one or two GPS signals because it is not possible to determine the location of the wireless terminal with only two GPS signals alone.

9 Claims, 32 Drawing Sheets

U.S. PATENT DOCUMENTS

| | | | |
|---|---|---|---|
| 5,717,406 | A | 2/1998 | Sanderford et al. |
| 6,026,304 | A | 2/2000 | Hilsenrath et al. |
| 6,134,448 | A | 10/2000 | Shoji et al. |
| 6,236,365 | B1 | 5/2001 | LeBlance et al. |
| 6,236,849 | B1 | 5/2001 | Reudink et al. |
| 6,249,252 | B1 | 6/2001 | Dupray et al. |
| 6,263,208 | B1 | 7/2001 | Chang et al. |
| 6,362,783 | B1 | 3/2002 | Sugiura et al. |
| 6,496,701 | B1 | 12/2002 | Chen et al. |
| 6,564,065 | B1 | 5/2003 | Chang et al. |
| 6,674,403 | B2 | 1/2004 | Gray et al. |
| 6,704,651 | B2 | 3/2004 | van Diggelen |
| 6,782,262 | B1 | 8/2004 | Lundborg |
| 6,799,047 | B1 | 9/2004 | Bahl et al. |
| 6,952,181 | B2 | 10/2005 | Karr et al. |
| 6,999,779 | B1 * | 2/2006 | Hashimoto ............... 455/456.2 |
| 7,010,306 | B1 * | 3/2006 | Tanibayashi et al. ..... 455/456.1 |
| 7,035,632 | B2 * | 4/2006 | Gutowski ................... 455/423 |
| 2001/0022558 | A1 * | 9/2001 | Karr et al. ................... 342/450 |
| 2003/0045303 | A1 * | 3/2003 | Oda et al. ................... 455/456 |
| 2003/0129992 | A1 * | 7/2003 | Koorapaty et al. .......... 455/456 |
| 2004/0198386 | A1 | 10/2004 | Dupray |
| 2006/0025158 | A1 * | 2/2006 | Leblanc et al. ........... 455/456.2 |

FOREIGN PATENT DOCUMENTS

| | | |
|---|---|---|
| WO | 03/058986 A2 | 7/2003 |
| WO | 2004/016032 A1 | 2/2004 |

OTHER PUBLICATIONS

Martin Hellebrant et al., "Estimating Position and Velocity of Mobiles in a Cellular Radio Network," IEEE Transactions on Vehicular Technology, vol. 46, No. 1, Feb. 1997, pp. 65-71.

J. Jimenez et al., "Mobile Location Using Coverage Information: Theoretical Analysis and Results," EURO-COST, Apr. 1999, pp. 1-9.

H. Koshima et al., "Personal Locator Services Emerge," IEEE Spectrum, Feb. 2000, pp. 41-48.

PCT International Search Report and Written Opinion of the International Searching Authority for International Application No. PCT/US2006/029513, mailed Nov. 20, 2006.

Dr. Heiko Schmitz, et al., A New Method for Positioning of Mobile Users by Comparing a Time Series of Measured Reception Power Levels with Predictions, IEEE, 0-7803-7757-5/03, pp. 1993-1997, 2003.

* cited by examiner

COMPUTATIONALLY-EFFICIENT ESTIMATION OF THE LOCATION OF A WIRELESS TERMINAL BASED ON PATTERN MATCHING

This application is a continuation in part of application Ser. No. 11/194,151 filed Aug. 1, 2005 which is a continuation of Ser. No. 10/299,398 filed Nov. 18, 2002 now U.S. Pat. No. 6,944,465. This application Ser. No. 11/419,652 also claims benefit of application Ser. No. 60/757,066 filed Jan. 6, 2006.

FIELD OF THE INVENTION

The present invention relates to telecommunications in general, and, more particularly, to a technique for estimating the location of a wireless terminal and using the estimate of the location in a location-based application.

BACKGROUND

FIG. 1 depicts a diagram of the salient components of wireless telecommunications system 100 in accordance with the prior art. Wireless telecommunications system 100 comprises: wireless terminal 101, base stations 102-1, 102-2, and 102-3, wireless switching center 111, assistance server 112, location client 113, and Global Positioning System ("GPS") constellation 121. Wireless telecommunications system 100 provides wireless telecommunications service to all of geographic region 120, in well-known fashion.

The salient advantage of wireless telecommunications over wireline telecommunications is the mobility that is afforded to the users. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her location. For example, the user might be interested in telling a remote party where he or she is or might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal.

In accordance with one technique, the location of a wireless terminal is estimated to be at the center of the cell or centroid of the sector in which the wireless terminal is located. This technique is advantageous in that it does not require that additional hardware be added to the wireless terminal or to the wireless telecommunications system, and, therefore, the first technique can be inexpensively implemented in legacy systems. The first technique is only accurate (in present cellular systems), however, to within a few kilometers, and, therefore, it is generally not acceptable for applications (e.g., emergency services dispatch, etc.) that require higher accuracy.

In accordance with a second technique, the location of a wireless terminal is estimated by triangulating the angle of arrival or multilaterating the time of arrival of the signals transmitted by the wireless terminal. This technique can achieve accuracy to within a few hundreds of meters and is advantageous in that it can be used with legacy wireless terminals. The disadvantage of this second technique, however, is that it generally requires that hardware be added to the telecommunication system's base stations, which can be prohibitively expensive.

In accordance with a third technique, the location of a wireless terminal is estimated by a radio navigation unit, such as, for example, a Global Positioning System (GPS) receiver, that is incorporated into the wireless terminal. This technique is typically accurate to within tens of meters but is disadvantageous in that it does not work consistently well indoors, in heavily wooded forests, or in urban canyons. Furthermore, the accuracy of this third technique can be severely degraded by multipath reflections.

Therefore, the need exists for a technique for estimating the location of a wireless terminal with higher resolution than the first technique and without some of the costs and disadvantages of the second and third techniques.

SUMMARY OF THE INVENTION

The present invention enables the construction and use of a system that can estimate the location of a wireless terminal without some of the costs and limitations associated with techniques for doing so in the prior art.

The present invention is based on the recognition that there are traits of electromagnetic signals that are dependent on topography, the receiver, the location of the transmitter, and other factors. For example, if a particular radio station is known to be received strongly at a first location and weakly at a second location, and a given wireless terminal at an unknown location is receiving the radio station weakly, it is more likely that the wireless terminal is at the second location than at the first location.

By quantifying "strongly" and "weakly" and extending this principle to multiple traits and multiple signals, the present invention can estimate the location of a wireless terminal with greater accuracy.

The illustrative embodiment comprises: receiving a measurement of a first characteristic of a first signal that is processed by a wireless terminal; designating at least one of a plurality of possible locations of the wireless terminal as improbable; and estimating the location of the wireless terminal based on a comparison of the measurement of the first characteristic of the first signal to a predicted value of the first characteristic of the first signal for at least one of the plurality of possible locations not designated as improbable.

DETAILED DESCRIPTION

For the purposes of this specification, the following terms and their inflected forms are defined as follows:

The term "location" is defined as a one-dimensional point, a two-dimensional area, or a three-dimensional volume.

The term "staying probability" is defined as an estimate of the probability $P_S(b, T, N, W)$ that wireless terminal W in location b at calendrical time T will still be in location b at time $T+\Delta t$, given environmental conditions, N.

The term "moving probability" is defined as an estimate of the probability $P_M(b, T, N, W, c)$ that wireless terminal W in location b at calendrical time T will be in adjacent location c at time $T+\Delta t$, given environmental conditions, N.

The term "environmental conditions N," are defined to include one or more physical aspects of the environment, and includes, but is not limited to, the weather, the astronomical conditions, atmospheric conditions, the quantity and density of radio traffic, the quantity and density of vehicular traffic, road and sidewalk construction, etc.

The term "calendrical time T" is defined as the time as denominated in one or more measures (e.g., seconds, minutes, hours, time of day, day, day of week, month, month of year, year, etc.).

Figure 1:
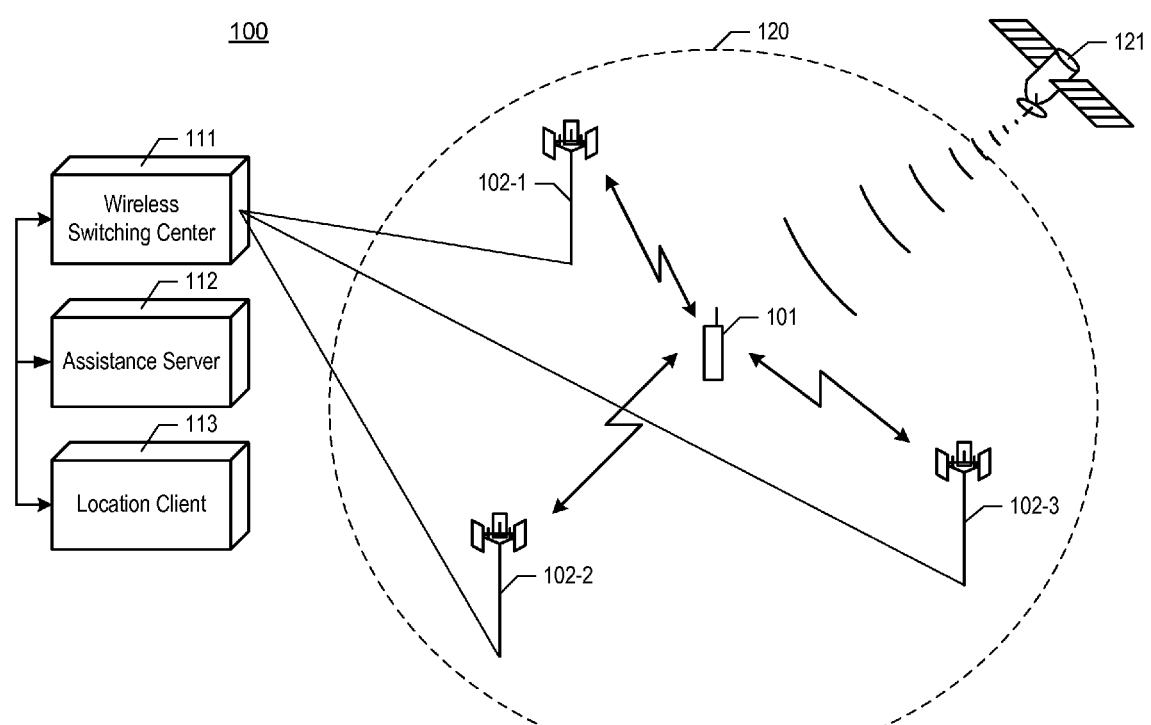
FIG. 1 depicts a map of a portion of a wireless telecommunications system in the prior art.
Figure 2:
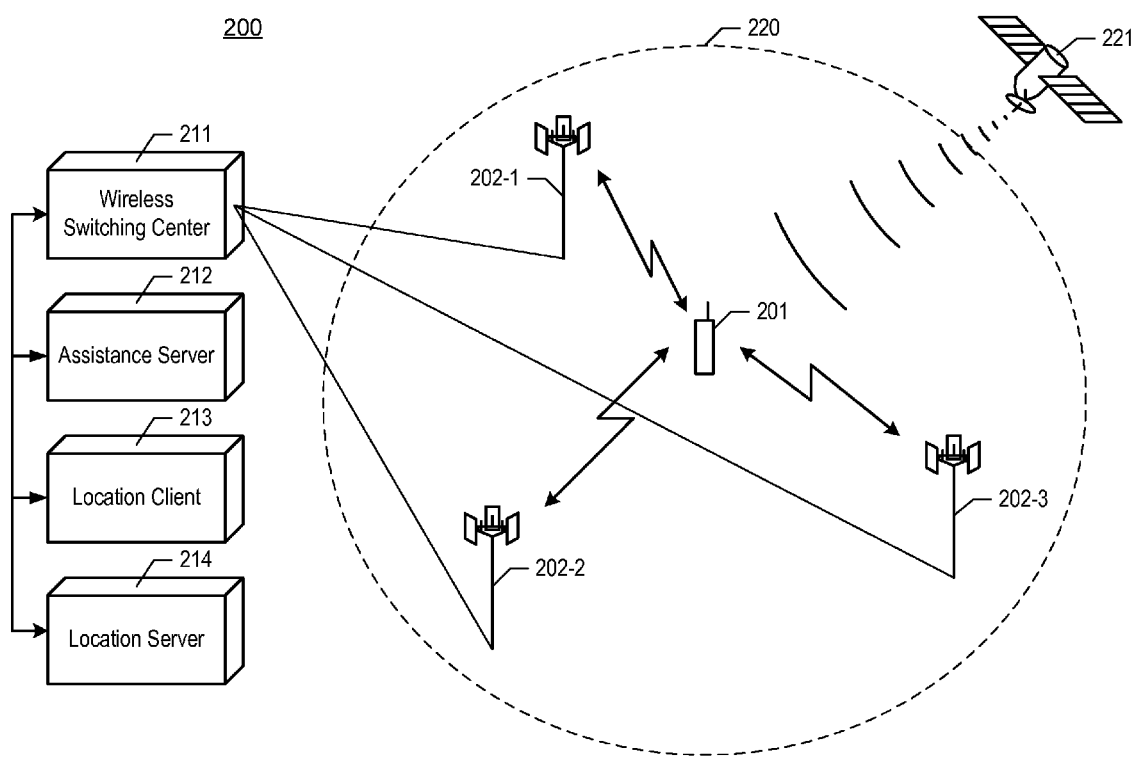
FIG. 2 depicts a diagram of the salient components of wireless telecommunications system 200 in accordance with the illustrative embodiment of the present invention.

Overview—FIG. 2 depicts a diagram of the salient components of wireless telecommunications system 200 in accordance with the illustrative embodiment of the present invention. Wireless telecommunications system 200 comprises: wireless terminal 201, base stations 202-1, 202-2, and 202-3, wireless switching center 211, assistance server 212, location client 213, location server 214, and GPS constellation 221, which are interrelated as shown. The illustrative embodiment provides wireless telecommunications service to all of geographic region 220, in well-known fashion, estimates the location of wireless terminal 201 within geographic region 220, and uses that estimate in a location-based application.

In accordance with the illustrative embodiment, wireless telecommunications service is provided to wireless terminal 201 in accordance with the Universal Mobile Telecommunications System, which is commonly known as "UMTS." After reading this disclosure, however, it will be clear to those skilled in the art how to make and use alternative embodiments of the present invention that operate in accordance with one or more other air-interface standards (e.g., Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be UMTS-compliant and to perform the processes described below and in the accompanying figures. For example and without limitation, wireless terminal 201 is capable of:

i. measuring one or more traits of one of more electromagnetic signals and of reporting the measurements to location server 214, and ii. transmitting one or more signals and of reporting the transmission parameters of the signals to location server 214, and iii. receiving GPS assistance data from assistance server 212 to assist it in acquiring and processing GPS ranging signals.

Wireless terminal 201 is mobile and can be at any location within geographic region 220. Although wireless telecommunications system 200 comprises only one wireless terminal, it will be clear to those skilled in the art, after reading this disclosure, how to make and use alternative embodiments of the present invention that comprise any number of wireless terminals.

Base stations 202-1, 202-2, and 202-3 communicate with wireless switching center 211 and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless switching center 211 comprises a switch that orchestrates the provisioning of telecommunications service to wireless terminal 201 and the flow of information to and from location server 214, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Assistance server 212 comprises hardware and software that is capable of performing the processes described below and in the accompanying figures. In general, assistance server 212 generates GPS assistance data for wireless terminal 201 to aid wireless terminal 201 in acquiring and processing GPS ranging signals from GPS constellation 221. In accordance with the illustrative embodiment, assistance server 212 is a separate physical entity from location server 214; however, it will be clear to those skilled in the art, after reading this disclosure, how to make and use alternative embodiments of the present invention in which assistance server 212 and location server 214 share hardware, software, or both.

Location client 213 comprises hardware and software that use the estimate of the location of wireless terminal 201—provided by location server 214—in a location-based application, as described below and in the accompanying figures.

Location server 214 comprises hardware and software that generate one or more estimates of the location of wireless terminal 201 as described below and in the accompanying figures. It will be clear to those skilled in the art, after reading this disclosure, how to make and use location server 214. Furthermore, although location server 214 is depicted in FIG. 2 as physically distinct from wireless switching center 211, it will be clear to those skilled in the art, after reading this disclosure, how to make and use alternative embodiments of the present invention in which location server 214 is wholly or partially integrated with wireless switching center 211.

In accordance with the illustrative embodiment, location server 214 communicates with wireless switching center 211, assistance server 212, and location client 213 via a local area network; however it will be clear to those skilled in the art, after reading this disclosure, how to make and use alternative embodiments of the present invention in which location server 214 communicates with one or more of these entities via a different network such as, for example, the Internet, the Public Switched Telephone Network (PSTN), etc.

In accordance with the illustrative embodiment, wireless switching center 211, assistance server 212, location client 213, and location server 214 are outside of geographic region 220. It will be clear to those skilled in the art, after reading this disclosure, how to make and use alternative embodiments of the present invention in which some or all of wireless switching center 211, assistance server 212, location client 213, and location server 214 are instead within geographic region 220.

Figure 3:
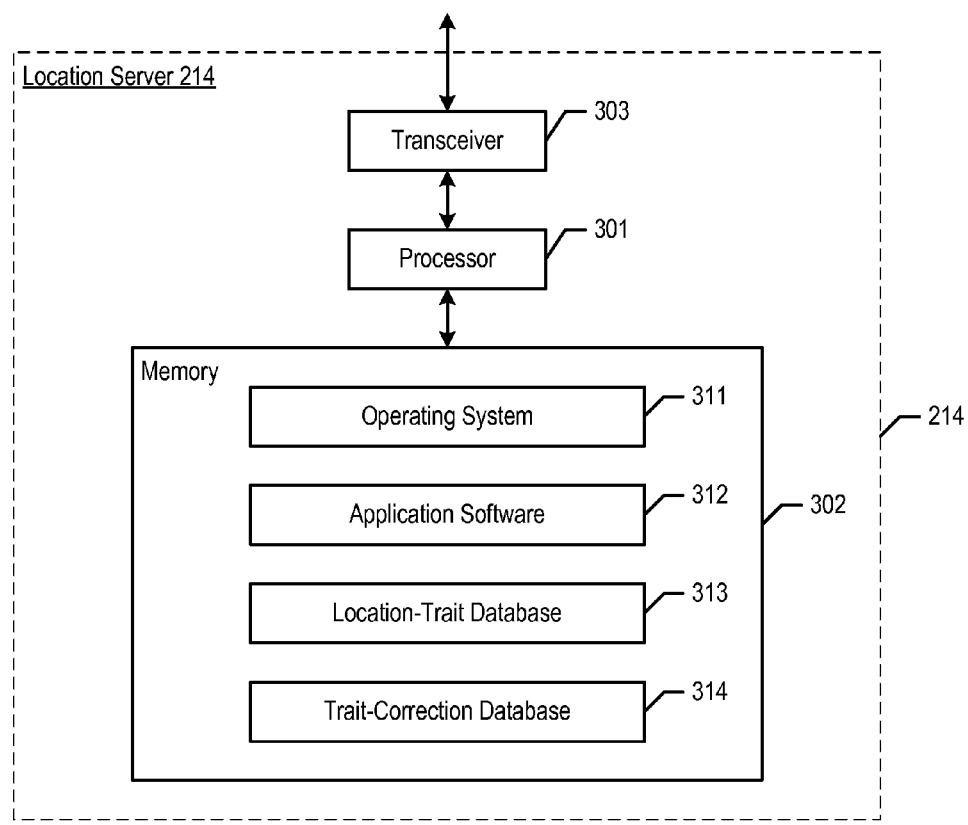
FIG. 3 depicts a block diagram of the salient components of location server 214, as shown in FIG. 2, in accordance with the illustrative embodiment.

Location Server 214—FIG. 3 depicts a block diagram of the salient components of location server 214 in accordance with the illustrative embodiment. Location server 214 comprises: processor 301, memory 302, and local-area network transceiver 303, which are interconnected as shown.

Processor 301 is a general-purpose processor that is capable of executing operating system 311 and application software 312, and of populating, amending, using, and managing Location-Trait Database 313 and Trait-Correction Database 314, as described in detail below and in the accompanying figures. It will be clear to those skilled in the art how to make and use processor 301.

Memory 302 is a non-volatile memory that stores:
i. operating system 311, and
ii. application software 312, and
iii. Location-Trait Database 313, and
iv. Trait-Correction Database 314.

It will be clear to those skilled in the art how to make and use memory 302.

Transceiver 303 enables location server 214 to transmit and receive information to and from wireless switching center 211, assistance server 212, and location client 213. In addition, transceiver 303 enables location server 214 to transmit information to and receive information from wireless terminal 201 and base stations 202-1 through 202-3 via wireless switching center 211. It will be clear to those skilled in the art how to make and use transceiver 303.

Figure 4:
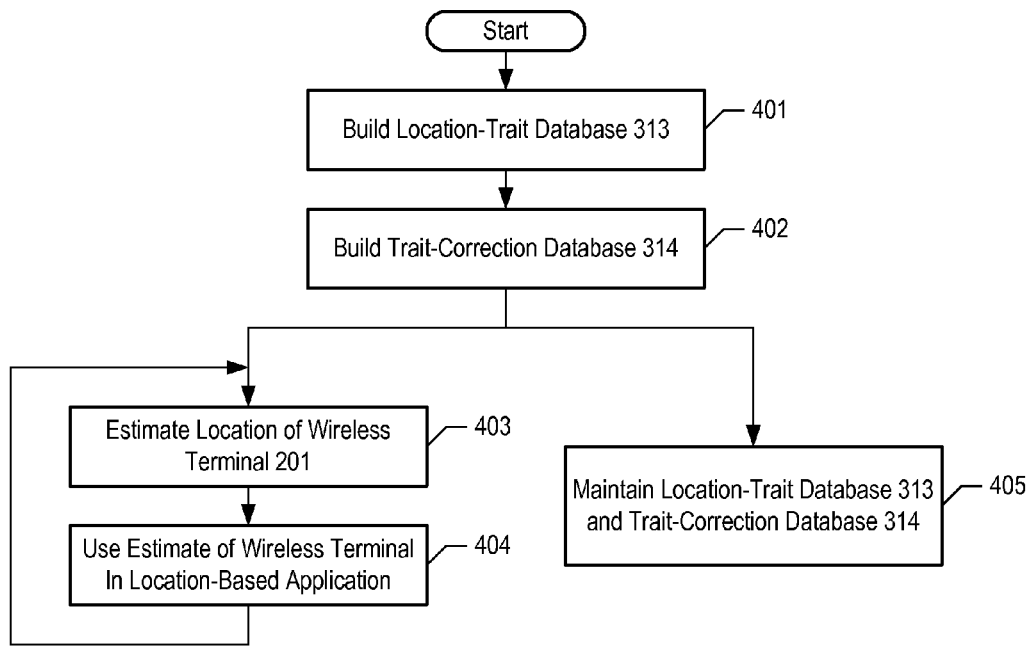
FIG. 4 depicts a flowchart of the salient processes performed in accordance with the illustrative embodiment of the present invention.

Operation of the Illustrative Embodiment—FIG. 4 depicts a flowchart of the salient processes performed in accordance with the illustrative embodiment of the present invention.

In accordance with process 401, Location-Trait Database 313 is built. For the purposes of this specification, the "Location-Trait Database" is defined as a database that maps each of a plurality of locations to one or more expected traits associated with a wireless terminal at that location. The details of building Location-Trait Database 313 are described below and in the accompanying figures.

In accordance with process 402, Trait-Correction Database 314 is built. For the purposes of this specification, the "Trait-Correction Database" is defined as a database that indicates how the measurement of traits can be adjusted to compensate for systemic measurement errors. The details of building Trait-Correction Database 314 are described below and in the accompanying figures.

In accordance with process 403, the location of wireless terminal 201 is estimated based on location-trait database 401, trait-correction database 402, and a variety of traits that vary based on the location of wireless terminal 201. The details of process 403 are described below and in the accompanying figures.

In accordance with process 404, the estimate of the location of wireless terminal 201 is used in a location-based application, such as and without limitation, E 9-1-1 service. The details of process 404 are described below and in the accompanying figures.

In accordance with process 405, Location-Trait Database 313 and Trait-Correction Database 314 are maintained so that their contents are accurate, up-to-date and complete. Process 405 is advantageous because the effectiveness of the illustrative embodiment is based on—and limited by—the accuracy, freshness, and completeness of the contents of Location-Trait Database 313 and Trait-Correction Database 314. The details of process 405 are described below and in the accompanying figures.

Figure 5:
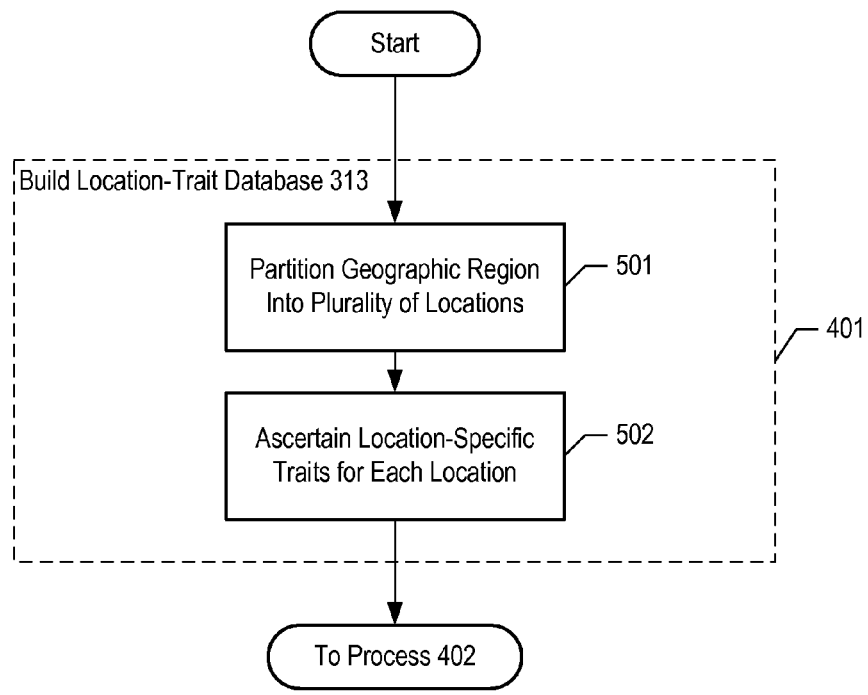
FIG. 5 depicts a flowchart of the salient processes performed in accordance with process 401 of FIG. 4: building Location-Trait Database 313.

Building Location-Trait Database 313—FIG. 5 depicts a flowchart of the salient processes performed in accordance with process 401—building Location-Trait Database 313.

In accordance with process 501, geographic region 220 is partitioned into B(T,N) locations, wherein B(T,N) is a positive integer greater than one, and wherein B(T,N) varies as a function of calendrical time T and the environmental conditions N. It will be clear to those skilled in the art, after reading this disclosure, how to make and use alternative embodiments of the present invention in which the number of locations that geographic region 220 is partitioned into is static. Furthermore, it will be clear to those skilled in the art, after reading this disclosure, how to make and use alternative embodiments of the present invention in which the number of locations that geographic region 220 is partitioned into is not dependent on the calendrical time T or the environmental conditions N.

Some traits of the radio frequency spectrum and of individual signals are different at different locations in geographic region 220. Similarly, some traits of the radio frequency spectrum and of individual signals transmitted by wireless terminal 201 change at base stations 202-1, 202-2, and 202-3 when wireless terminal 201 is at different locations. Furthermore, some traits (e.g., hand-off state, etc.) of wireless telecommunications system 200 change when wireless terminal 201 is at different locations.

When wireless terminal 201 is at a particular location, the values of the traits that vary with the location of wireless terminal 201 represent a "fingerprint" or "signature" for that location that enables location server 214 to estimate the location of wireless terminal 201. For example, suppose that under normal conditions the traits have a first set of values when wireless terminal 201 is at a first location, and a second set of values when wireless terminal 201 is at a second location. Then when wireless terminal 201 is at an unknown location and the traits at that unknown location match the second set of values, it is more likely that wireless terminal 201 is at the second location.

Although human fingerprints and handwritten signatures are generally considered to be absolutely unique, the combination of traits associated with each location might not be absolutely unique in geographic region 220. The effectiveness of the illustrative embodiment is enhanced, however, as differences in the values of the traits among the locations increases. It will be clear to those skilled in the art, after reading this disclosure, how to select locations and traits in order to increase the likelihood that the values of the traits associated with each location are distinguishable from the values of the traits associated with the other locations.

Each location is described by:
 i. a unique identifier b,
 ii. its dimensionality (e.g., one-dimension, two dimensions, three dimensions, four-dimensions, etc.),
 iii. the coordinates (e.g., latitude, longitude, altitude, etc.) that define its scope (e.g., position, area, volume, etc.), which can be static or, alternatively, can vary as a function of calendrical time T or the environmental conditions N, or both the calendrical time T and the environmental conditions N.
 iv. the expected value $E(b, T, N, W, Q)$ for each trait, Q, when wireless terminal W is at location b at calendrical time T given environmental conditions, N,
 v. the identities of its adjacent locations, and
 vi. the staying and moving probabilities $P_S(b, T, N, W)$ and $P_M(b, T, N, W, c)$.

In accordance with the illustrative embodiment, the identifier of each location is an arbitrarily-chosen positive integer. It will be clear to those skilled in the art, after reading this disclosure, how to make and use alternative embodiments of the present invention in which the identifier of some or all locations is not arbitrarily chosen. Furthermore, it will be clear to those skilled in the art, after reading this disclosure, how to make and use alternative embodiments of the present invention in which the identifier of some or all locations is not a positive integer.

In accordance with the illustrative embodiment, the scope of each location is three-dimensional and is described by (i) one or more three-dimensional coordinates and geometric identifiers that define its boundaries, (ii) a three-dimensional coordinate that resides at the centroid of the location, and (iii) a description of how the scope changes as a function of calendrical time T and environmental conditions N. It will be clear to those skilled in the art, after reading this disclosure, how to make and use alternative embodiments of the present invention in which the scope of some or all of the locations are one-dimensional or two-dimensional. Furthermore, it will be clear to those skilled in the art, after reading this disclosure, how to make and use alternative embodiments of the present invention in which the scope of some or all of the locations are not a function of calendrical time T or environmental conditions N.

In accordance with the illustrative embodiment, the scope of two or more locations can overlap at zero, one, two, more than two, or all points of latitude and longitude (e.g., an overpass and underpass, different stories in a multi-story building as described below, etc.).

In accordance with the illustrative embodiment, the boundaries of each location are based, at least in part, on:
 i. natural and man-made physical attributes of geographic region 220 (e.g., buildings, sidewalks, roads, tunnels, bridges, hills, walls, water, cliffs, rivers, etc.),
 ii. legal laws governing geographic region 220 (e.g., laws that pertain to the location and movement of people and vehicles, etc.),
 iii. theoretical predictions and empirical data regarding the location and movement of individuals and groups of people and vehicles in geographic region 220,
 iv. the desired accuracy of the estimates made by location server 214, and
 v. patterns of the location and movement of people and vehicles within geographic region 220,
 vi. the calendrical time T, and
 vii. the environmental conditions N, subject to the following considerations:

First, the accuracy with which wireless terminal 201 can be located potentially increases with smaller location sizes. Not all locations need to be the same size, however, and areas requiring greater accuracy can be partitioned into smaller sizes, whereas areas requiring less accuracy can be partitioned into larger sizes.

Second, as the number of locations in geographic region 220 increases, so does the computational burden on location server 214 as described below with respect to FIG. 10.

Third, as the size of adjacent locations decreases, the likelihood increases that the expected values for the traits in those locations will be identical or very similar, which can hinder the ability of location server 214 to correctly determine when wireless terminal 201 is in one location versus the other.

With these considerations in mind, it will be clear to those skilled in the art, after reading this disclosure, how to make and use alternative embodiments of the present invention that partition geographic region 220 into any number of locations of any size, shape, and arrangement. Furthermore, it will be clear to those skilled in the art, after reading this disclosure, how to make and use embodiments of the present invention in which the locations are identical in size and shape.

Figure 6A:
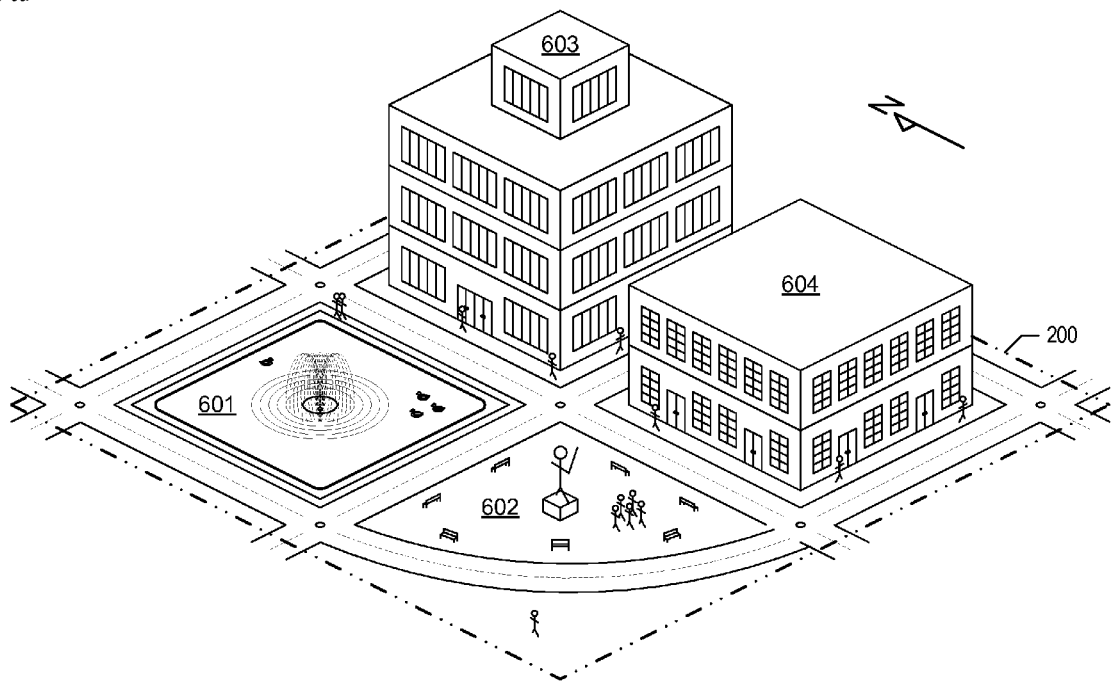
FIGS. 6a through 6k depict geographic regions and their deconstruction into a plurality of locations.
Figure 6B:
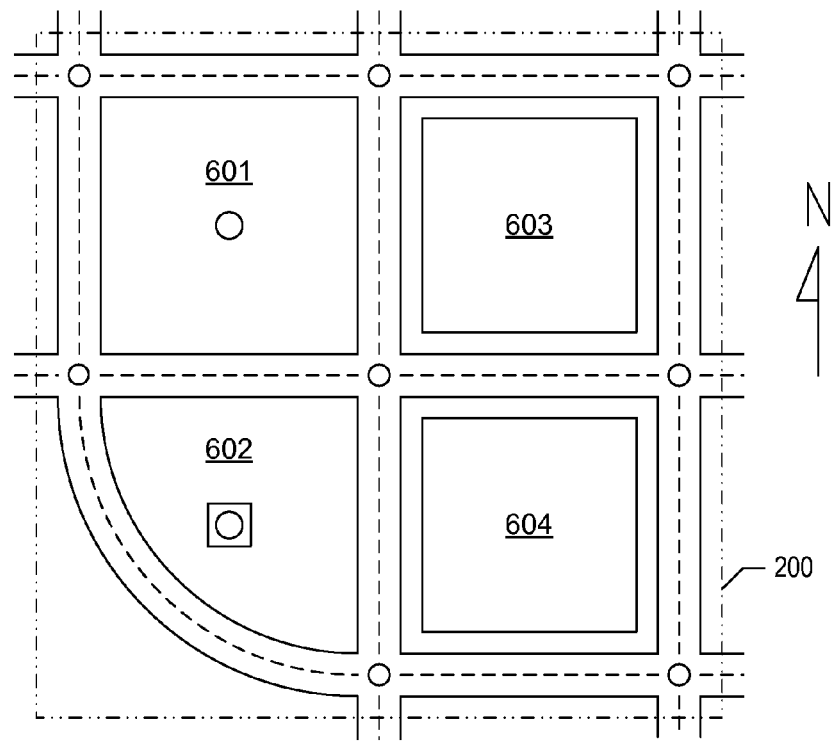

FIG. 6a depicts an isometric drawing of geographic region 220 and FIG. 6b depicts a map of geographic region 220. Geographic region 220 comprises water fountain 601, park 602, four-story building 603, two-story building 604, various streets, sidewalks, and other features that are partitioned into 28 locations as described below and depicted in FIGS. 6c through 6e. Although geographic region 220 comprises approximately four square blocks in the illustrative embodiment, it will be clear to those skilled in the art how to make and use alternative embodiments of the present invention with geographic regions of any size, topology, and complexity.

Figure 6C:
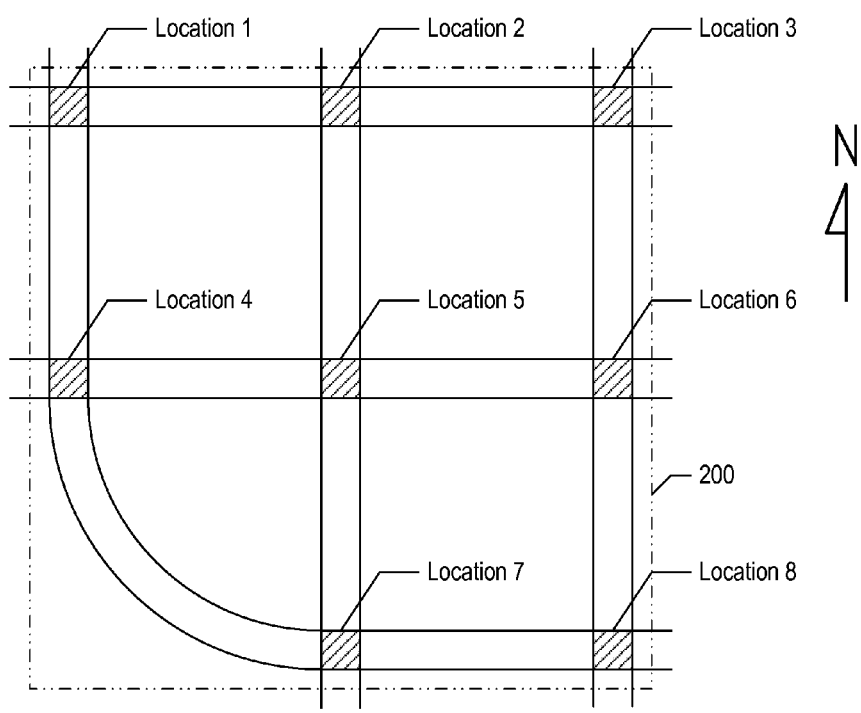
Figure 6D:
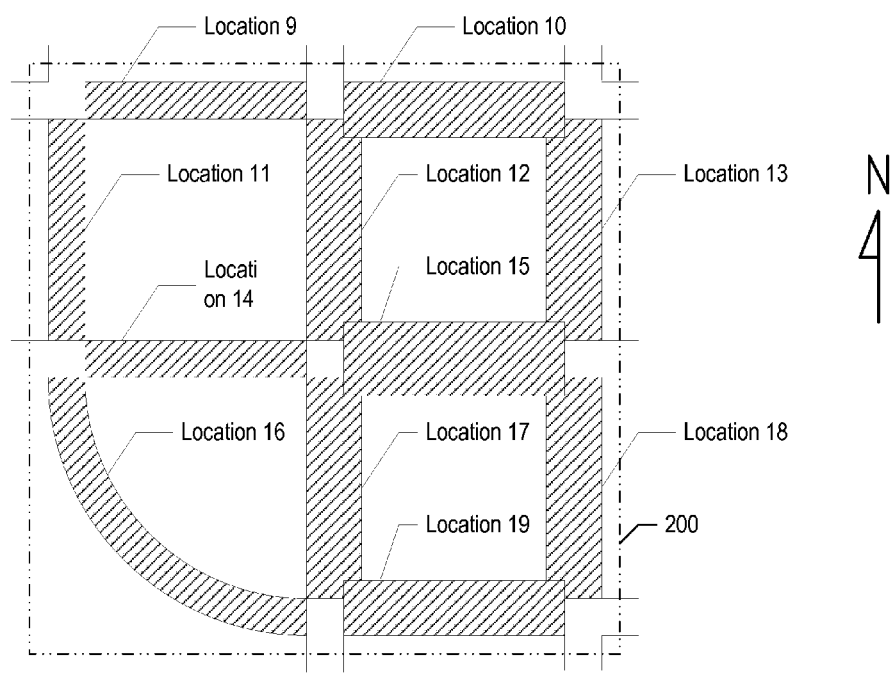
Figure 6E:
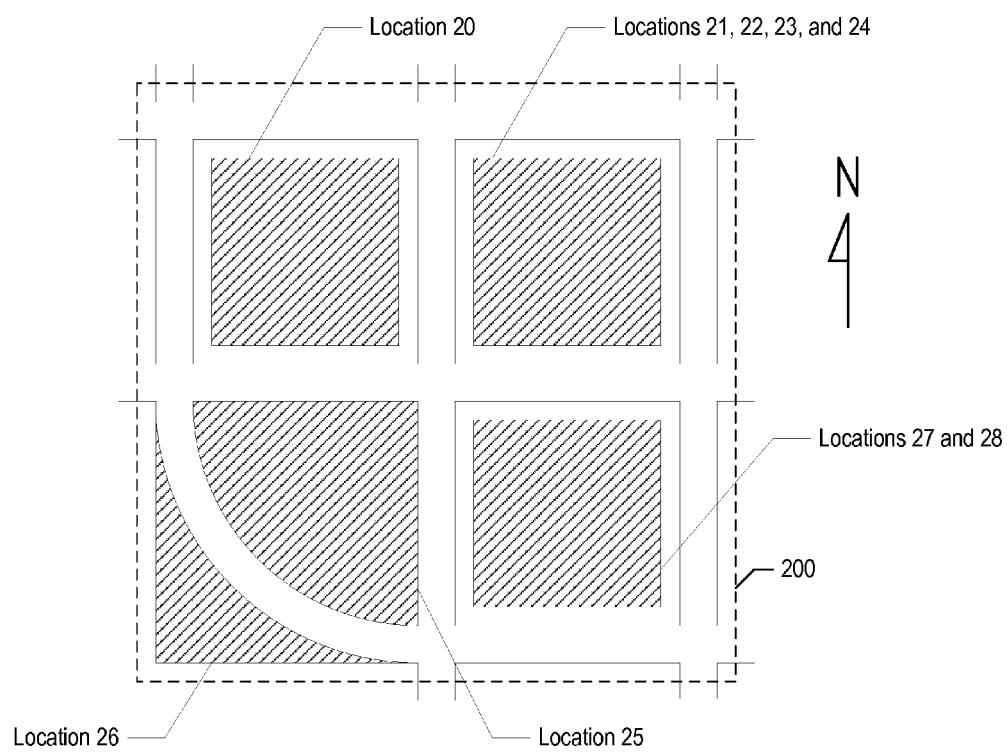

In accordance with the illustrative embodiment, the eight road intersections are partitioned into Locations 1 through 8, as depicted in FIG. 6c. In accordance with the illustrative embodiment, the street sections and their adjacent sidewalks up to the edge of buildings 603 and 604 are partitioned into Locations 9 through 19, as depicted in FIG. 6d. In accordance with the illustrative embodiment, water fountain 601 is partitioned into Location 20, park 602 is partitioned into Location 25, each floor of building 604 is classified as one of Locations 21, 22, 23, and 24, and each floor of building 603 is classified as of one of Locations 27 and 28. It will be clear to those skilled in the art, however, after reading this disclosure, how to partition geographic region 220 into any number of locations of any size and shape.

Figure 6F:
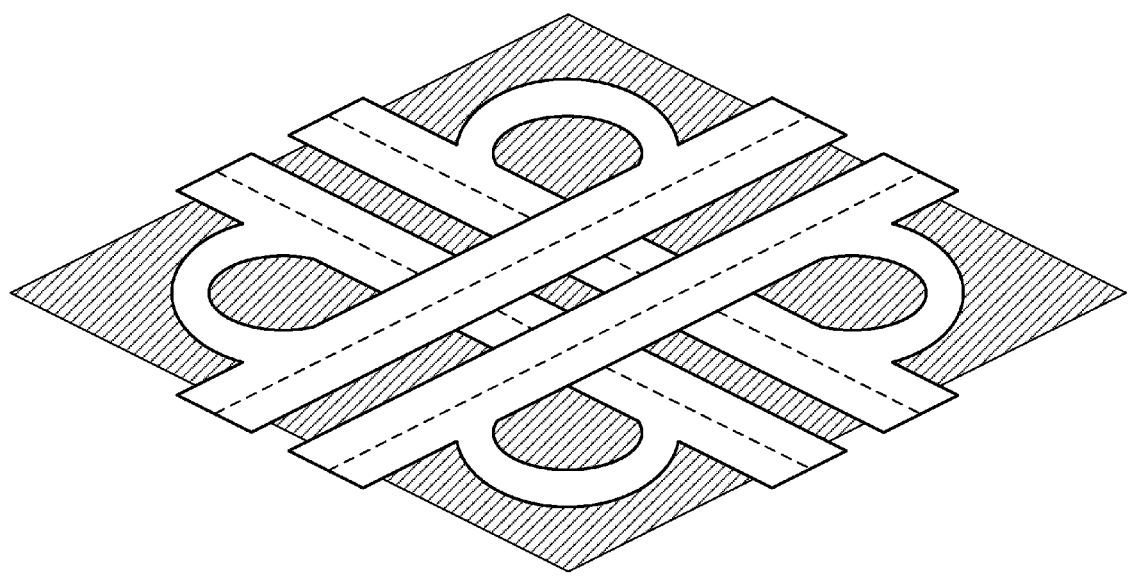
Figure 6G:
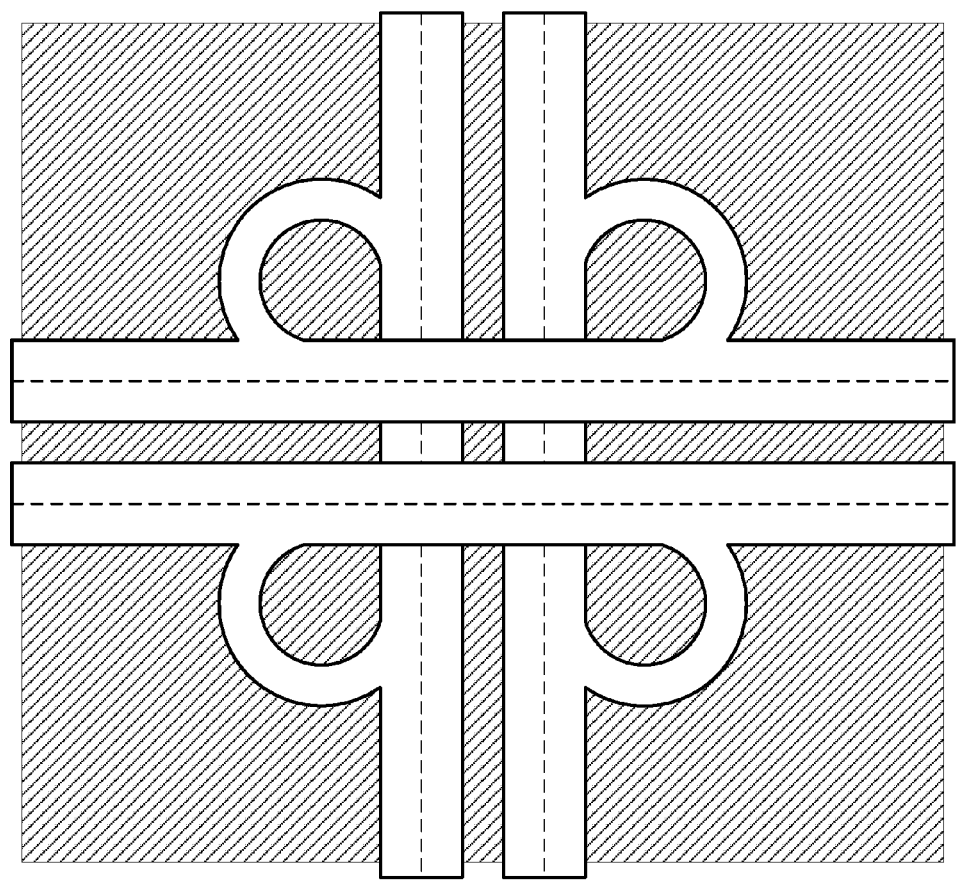
Figure 6H:
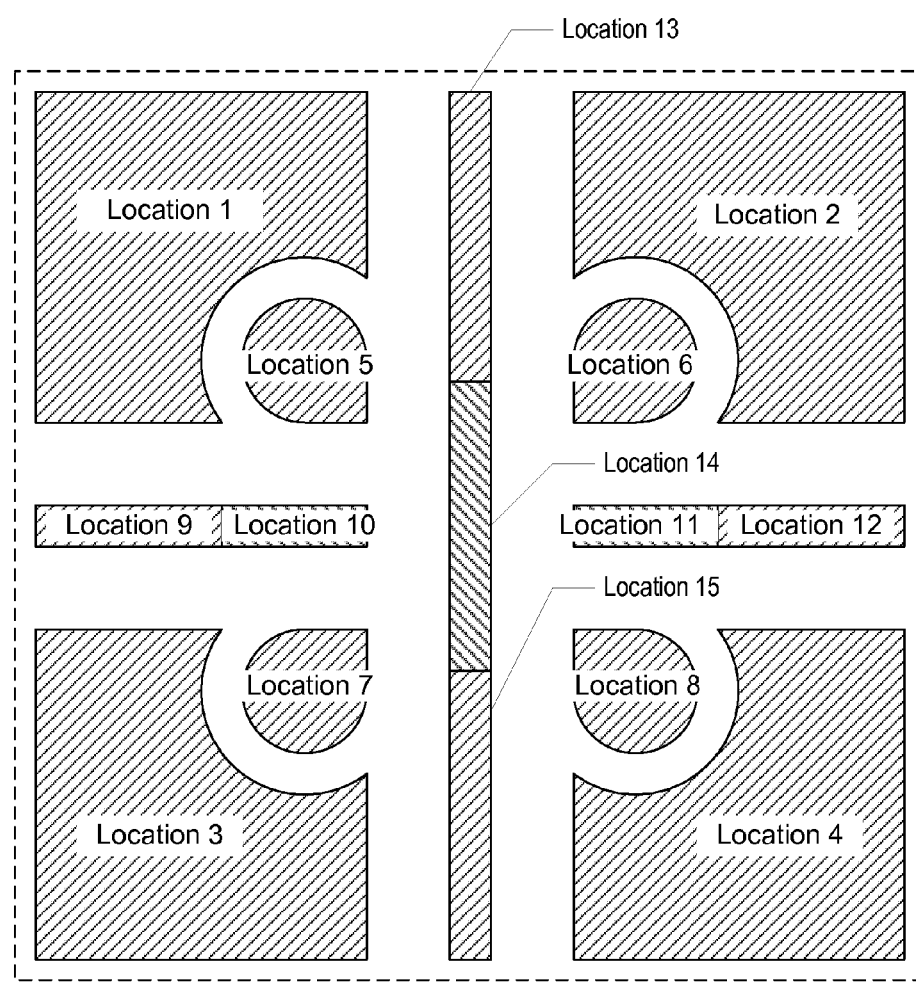
Figure 6I:
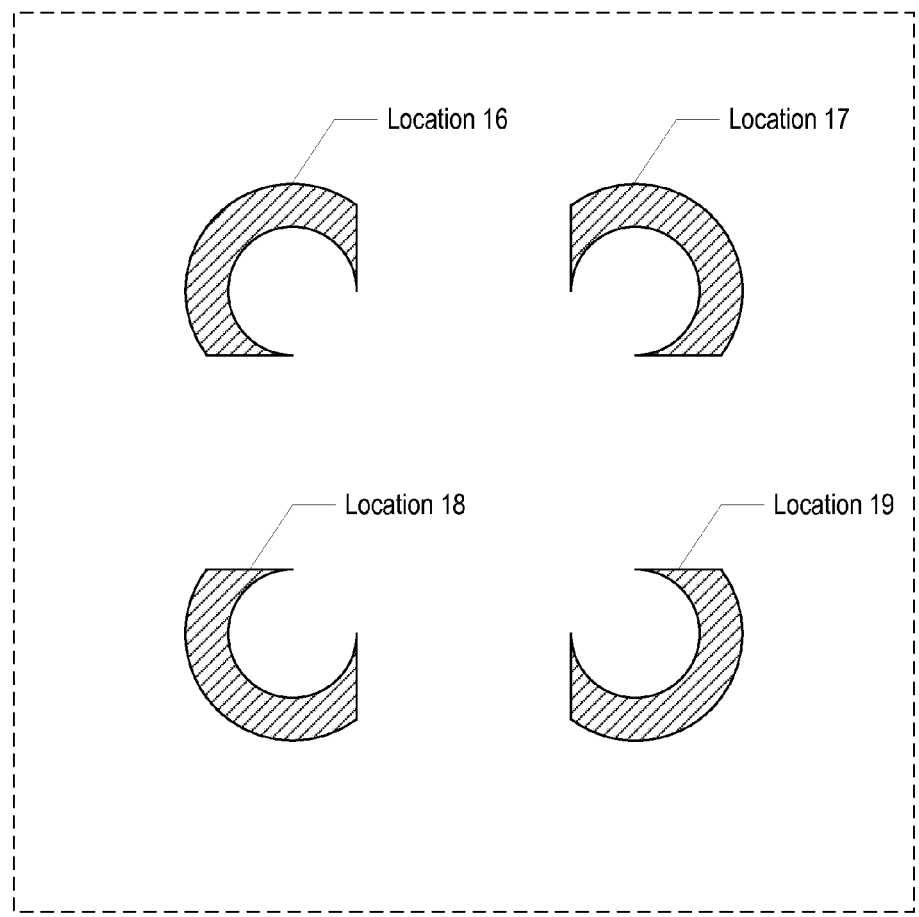
Figure 6J:
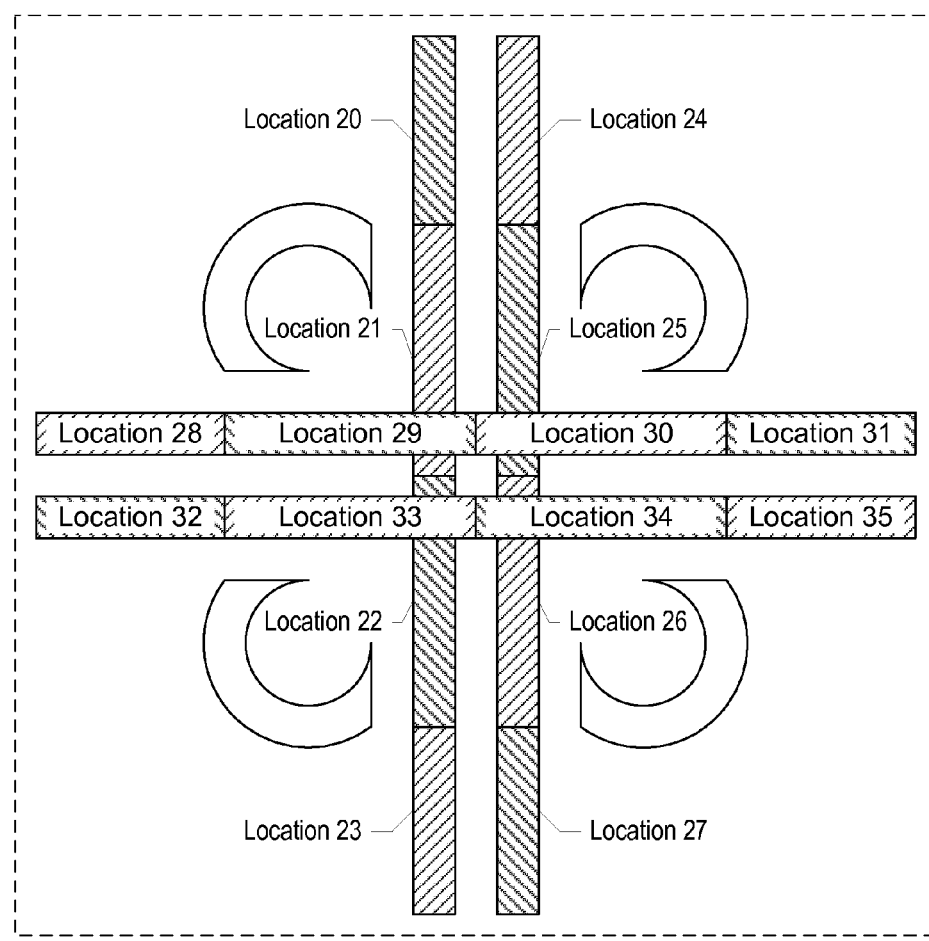
Figure 6K:
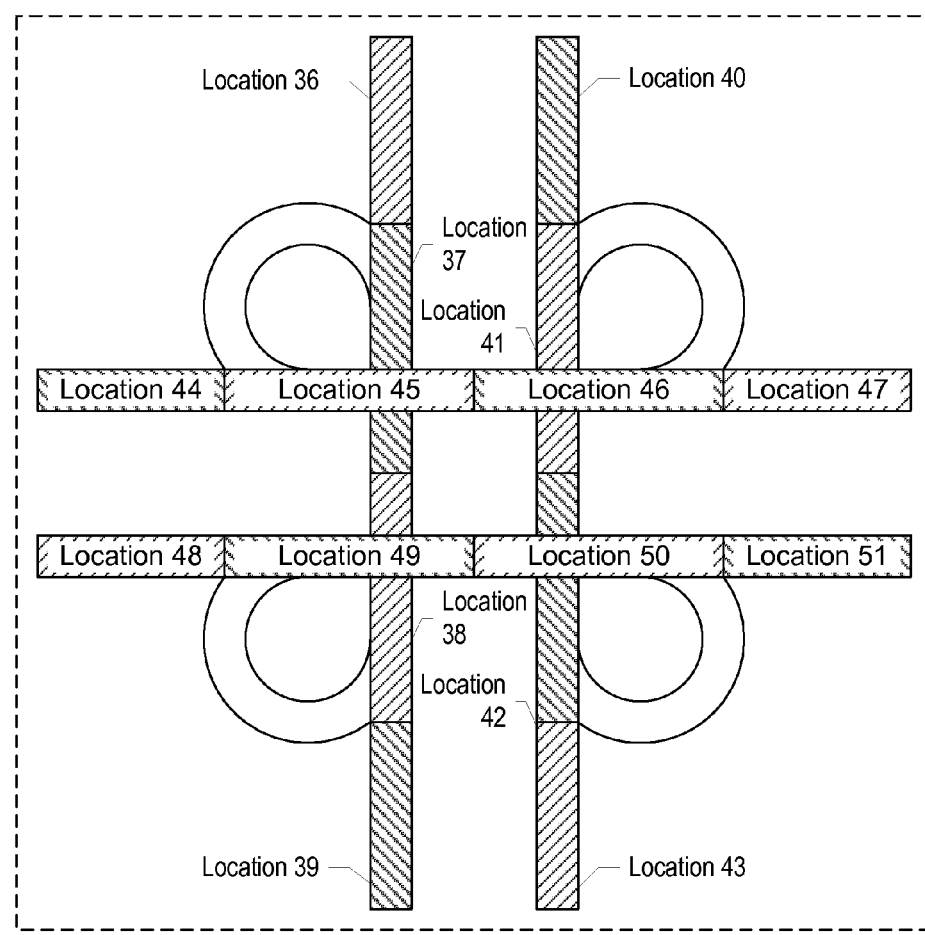

In accordance with an alternative embodiment of the present invention, a geographic region that comprises a clover-leaf intersection of two, four-lane divided highways is partitioned into 51 locations. FIG. 6f depicts an isometric drawing of the intersection, and FIG. 6g depicts a map of the intersection. In accordance with the illustrative embodiment, the grass and medians have been partitioned into 15 locations as depicted in FIG. 6g, the four ramps have been partitioned into four locations as depicted in FIG. 6h, the inner or "passing" lanes have been partitioned into eight locations as depicted in FIG. 6i, and the outer or "travel" lanes have been partitioned into eight locations as depicted in FIG. 6j.

Figure 6L:
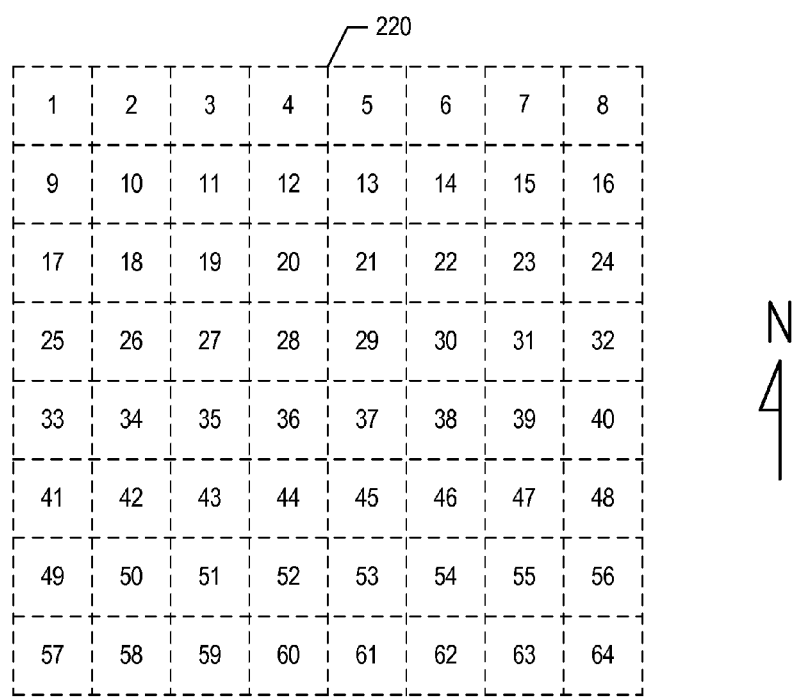
FIG. 6L depicts an alternative partitioning of geographic region 220 into 64 square locations.

FIG. 6L depicts an alternative partitioning of geographic region 220 into 64 square locations.

In accordance with process 502, the expected values E(b, T, N, W, Q) for the following traits is associated with each location:

i. the expected pathloss of all of the signals receivable by wireless terminal 201 when wireless terminal 201 is at the location, from all transmitters (e.g., base stations 202-1, 202-2, and 202-3, commercial television, commercial radio, navigation, ground-based aviation, etc.), as a function of the calendrical time, T, and the environmental conditions, N; and ii. the expected pathloss of all of the signals transmitted by wireless terminal 201 when wireless terminal 201 is in the location as receivable at base stations 202-1, 202-2, and 202-3, as a function of the calendrical time, T, and the environmental conditions, N; and iii. the expected received signal strength of all of the signals receivable by wireless terminal 201 when wireless terminal 201 is in the location, from all transmitters, as a function of the calendrical time, T, and the environmental conditions, N; and iv. the expected received signal strength of all of the signals transmitted by wireless terminal 201 when wireless terminal 201 is in the location as receivable at base stations 202-1, 202-2, and 202-3, as a function of the calendrical time, T, and the environmental conditions, N; and v. the expected received signal-to-impairment ratio (e.g., Eb/No, etc.) of all of the signals receivable by wireless terminal 201 when wireless terminal 201 is in the location, from all transmitters, as a function of the calendrical time, T, and the environmental conditions, N; and vi. the expected received signal-to-impairment ratio of all of the signals transmitted by wireless terminal 201 when wireless terminal 201 is in the location as receivable at base stations 202-1, 202-2, and 202-3, as a function of the calendrical time, T, and the environmental conditions, N; and vii. the expected received temporal difference of each pair of multipath components (e.g., one temporal difference for one pair of multipath components, a pair of temporal differences for a triplet of multipath components, etc.) of all of the signals receivable by wireless terminal 201 when wireless terminal 201 is in the location, from all transmitters, as a function of the calendrical time, T, and the environmental conditions, N; and viii. the expected received temporal difference of each pair of multipath components (e.g., one temporal difference for one pair of multipath components, a pair of temporal differences for a triplet of multipath components, etc.) of all of the signals transmitted by wireless terminal 201 when wireless terminal 201 is in the location as receivable at base stations 202-1, 202-2, and 202-3, as a function of the calendrical time, T, and the environmental conditions, N; and ix. the expected received delay spread (e.g., RMS delay spread, excess delay spread, mean excess delay spread, etc.) of all of the signals receivable by wireless terminal 201 when wireless terminal 201 is in the location, from all transmitters, as a function of the calendrical time, T, and the environmental conditions, N; and x. the expected received delay spread (e.g., RMS delay spread, excess delay spread, mean excess delay spread, etc.) of all of the signals transmitted by wireless terminal 201 when wireless terminal 201 is in the location as receivable at base stations 202-1, 202-2, and 202-3, as a function of the calendrical time, T, and the environmental conditions, N; and xi. the expected received relative arrival times of two or more multipath components of all of the signals receivable by wireless terminal 201 when wireless terminal 201 is in the location, from all transmitters (which can be determined by a rake receiver in well-known fashion), as a function of the calendrical time, T, and the environmental conditions, N; and xii. the expected received relative arrival times of two or more multipath components of all of the signals transmitted by wireless terminal 201 when wireless terminal 201 is in the location as receivable at base stations 202-1, 202-2, and 202-3, as a function of the calendrical time, T, and the environmental conditions, N; and xiii. the expected round-trip time of all of the signals transmitted and receivable by wireless terminal 201 through base stations 202-1, 202-2, and 202-3, as a function of the calendrical time, T, and the environmental conditions, N; and xiv. the expected round-trip time of all of the signals transmitted and receivable by base stations 202-1, 202-2, and 202-3 through wireless terminal 201, as a function of the calendrical time, T, and the environmental conditions, N; and xv. the identity of the base stations that provide telecommunications service to the location, as a function of the calendrical time, T, and the environmental conditions, N; and xvi. the identities of the neighboring base stations that provide telecommunications service to the location, as a function of the calendrical time, T, and the environmental conditions, N; and xvii. the handover state (e.g., soft, softer, 1×, 2×, etc.) of wireless terminal 201 and wireless telecommunication system 200 when wireless terminal 201 is in the location as a function of the calendrical time, T, and the environmental conditions, N.

In accordance with the illustrative embodiment of the present invention, all signals transmitted by wireless terminal 201 are for communicating with base stations 202-1 through 202-3, and all of the signals received by wireless terminal 201 are:

signals transmitted by base stations 202-1 through 202-3 for communicating with wireless terminal 201,
television signals,
radio signals,
aviation signals, and
navigation signals.

It will be clear to those skilled in the art, after reading this disclosure, how to make and use alternative embodiments of the present invention that use different signals.

In accordance with the illustrative embodiment, the expected values of these traits are determined through a combination of:

i. a plurality of theoretical and empirical radio-frequency propagation models, and ii. a plurality of empirical measurements of the traits within geographic region 220, in well-known fashion. The empirical measurements of the traits are stored within location-trait database 313 and updated as described below.

In accordance with the illustrative embodiment of the present invention, each location b is described by the identities of its adjacent locations, (i.e., the locations that wireless terminal 201 can reasonably move into from location b within one time step Δt.) In accordance with the illustrative embodiment, two locations are considered to be "adjacent" when and only when they have at least two points in common. It will be clear to those skilled in the art, however, after reading this disclosure, how to make and use alternative embodiments of the present invention in which two locations are considered adjacent when they have zero points or one point in common.

Figure 6M:
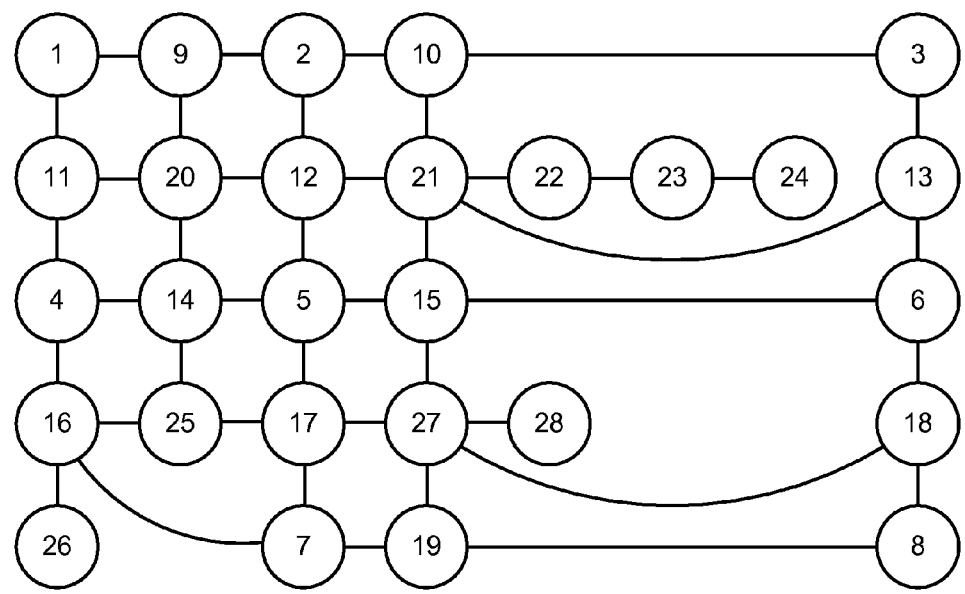
FIG. 6m depicts a graphical representation of an adjacency graph of geographic region 220 as partitioned in FIGS. 6c through 6e.
Figure 6N:
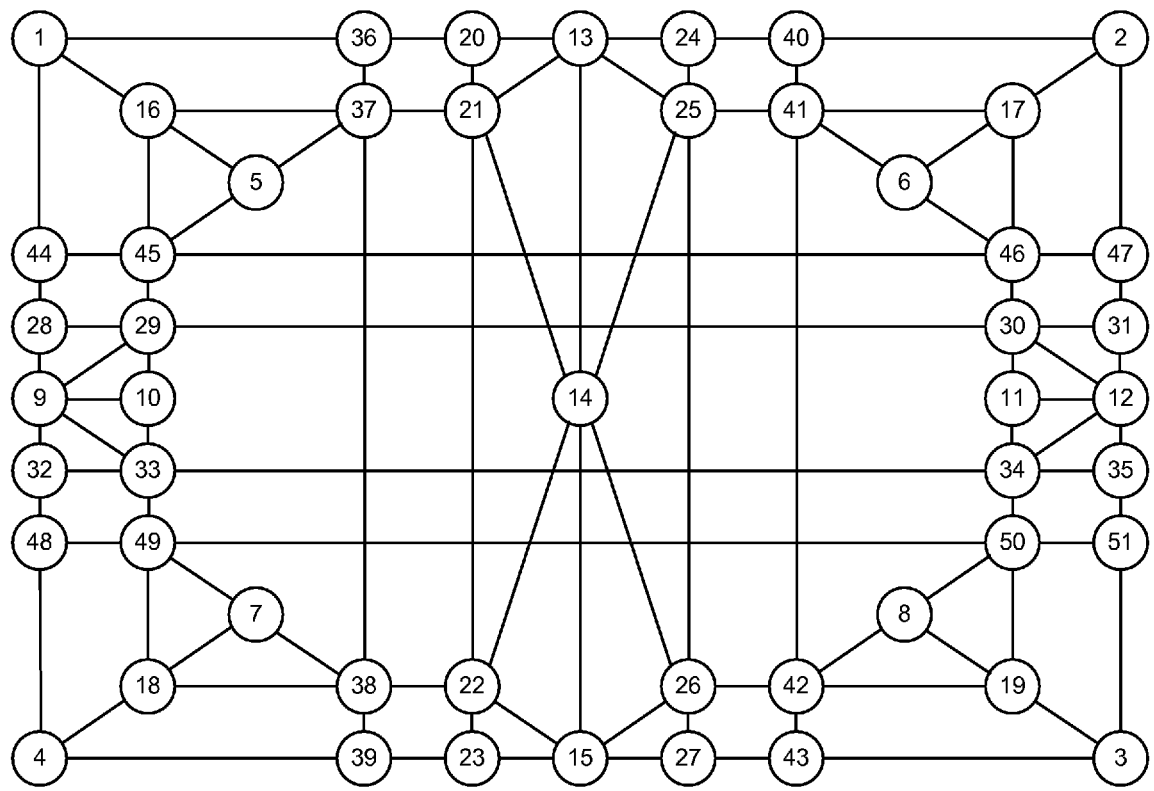
FIG. 6n depicts a graphical representation of an adjacency graph of the highway intersection partitioned in FIGS. 6h through 6k.

Adjacency Graph—In accordance with the illustrative embodiment, a data structure is created that indicates which locations are adjacent. This data structure is called an "adjacency graph" and it is stored within Location-Trait Database 313 in sparse-matrix format. FIG. 6m depicts a graphical representation of the adjacency graph for the 28 locations that compose geographic area 220, and FIG. 6n depicts a graphical representation of the adjacency graph for the 51 locations that compose the highway intersection in FIGS. 6f through 6k.

As described in detail below and in the accompanying figures, the adjacency graph is used in the temporal analysis of wireless terminal 201's movements. It will be clear to those skilled in the art, after reading this disclosure, how to make the adjacency graph for any partitioning of geographic region 220.

In accordance with the illustrative embodiment, the staying and moving probabilities $P_S(b, T, N, W)$ and $P_M(b, T, N, W, c)$ for all b are generated based on a model of the movement of wireless terminal W that considers:

i. the topology of the adjacency graph; and ii. the calendrical time T; and iii. the environmental conditions N; and iv. the natural and man-made physical attributes that affect the location and movement of wireless terminals and the entities that carry them (e.g., buildings, sidewalks, roads, tunnels, bridges, hills, walls, water, cliffs, rivers, etc.); and v. the legal laws governing the location and movement of wireless terminals and the entities that carry them (e.g., one-way streets, etc.); and vi. the past data for the movement of all wireless terminals; and vii. the past data for the movement of wireless terminal W.

It will be clear to those skilled in the art, after reading this disclosure, how to make and use alternative embodiments of the present invention that use any subcombination of i, ii, iii, iv, v, vi, and vii to generate the staying and moving probabilities for each location b.

The moving probabilities $P_M(b, T, N, W, c)$ associated with a location b can be considered to be either isotropic or non-isotropic. For the purposes of this specification, "isotropic moving probabilities" are defined as those which reflect a uniform likelihood of direction of movement and "non-isotropic moving probabilities" are defined as those which reflect a non-uniform likelihood of direction of movement. For example, for locations arranged in a two-dimensional regular hexagonal grid the values of $P_M(b, T, N, W, c)$ of location b are isotropic if and only if they are all equal (e.g., $P_M(b, T, N, W, c)=\frac{1}{6}$ for each adjacent location c). Conversely, the values of $P_M(b, T, N, W, c)$ are non-isotropic if there are at least two probabilities with different values. As another example, for locations arranged in a two-dimensional "checkerboard" grid, the values of $P_M(b, T, N, W, c)$ are isotropic if and only if:

(i) the north, south, east, and west moving probabilities out of location b all equal p, (ii) the northeast, northwest, southeast, and southwest moving probabilities out of location b all equal $p/\sqrt{2}$, and (iii) $4p(1+1/\sqrt{2})+P_S(b, T, N, W)=1$.

Isotropic moving probabilities are simple to generate, but are considerably less accurate than non-isotropic moving probabilities that are generated in consideration of the above criteria. Therefore, in accordance with the illustrative embodiment, the moving probabilities are non-isotropic, but it will be clear to those skilled in the art, after reading this disclosure, how to make and use alternative embodiments of the present invention that use isotropic moving probabilities.

Figure 7:
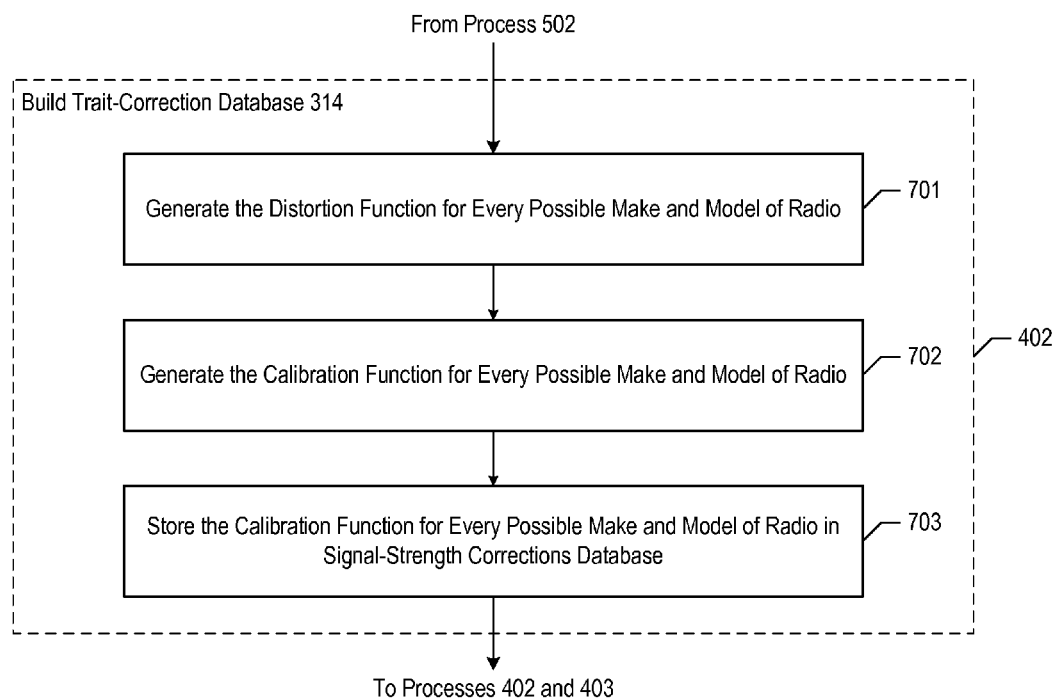
FIG. 7 depicts a flowchart of the salient processes performed as part of process 402 of FIG. 4: populating Trait-Correction Database 313.

Populating Trait-Correction Database 313—FIG. 7 depicts a flowchart of the salient processes performed as part of process 402: populating Trait-Correction Database 313.

In general, the ability of location server 214 to estimate the location of wireless terminal 201 is limited by the accuracy with which the traits are measured by wireless terminal 201 and by base stations 202-1, 202-2, and 202-3. When the nature or magnitude of the measurement errors is unpredictably inaccurate, there is little that can be done to overcome them.

In contrast, when the nature and magnitude of the measurement errors are predictable, they can be corrected, and the nature and magnitude of some measurement errors are, in fact, predictable. For example, one make and model of wireless terminal is known to erroneously measure and report the signal strength of signals by −2 dB. If the measurements from this model of wireless terminal are left uncorrected, this −2 dB error could cause location server 214 to erroneously estimate the location of the wireless terminal. In contrast, if location server 214 adds 2 dB to the measurements from that make and model of wireless terminal, the likelihood that location server 214 would erroneously estimate the location of the wireless terminal would be reduced.

Trait-Correction Database 313 comprises the information needed by location server 214 to be aware of systemic measurement errors and to correct them. A technique for eliminating some situational errors in the measurements is described below and in the accompanying figures.

In accordance with process 701, a distortion function is generated for every radio that might provide measurements to location server 214 and for every trait whose measurements can be erroneous.

In general, the distortion function D(A,K,Q) relates the reported measurement R for a trait Q to the actual value A for that trait and the defining characteristic K of the radio making the measurement:

$$R = D(A, K, Q). \tag{Eq. 1}$$

In accordance with the illustrative embodiment, the distortion function D(A,K,Q) is provided to the owner/operator of location server 214 by the radio manufacturer. It will be clear to those skilled in the art, however, after reading this disclosure, how to generate the distortion function D(A,K,Q) for any radio without the assistance of the radio manufacturer.

Figure 8A:
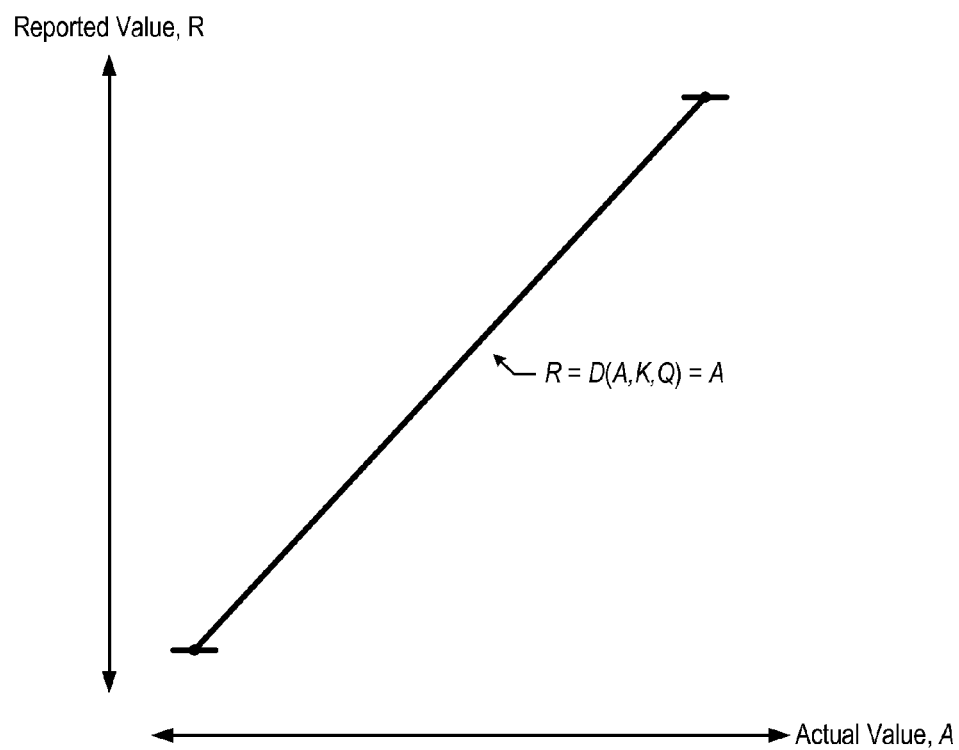
FIGS. 8a through 8c depict illustrative distortion and correction curves.

An ideal radio perfectly measures and reports the value of the traits it receives and the distortion function D(A,K,Q) for one trait and for an ideal radio is depicted in FIG. 8a. As can be seen from the graph in FIG. 8a, the salient characteristic of an ideal radio is that the reported value of the measurement, R, is exactly equal to the actual value of the trait A at the radio (i.e., there is no measurement or reporting error).

Figure 8B:
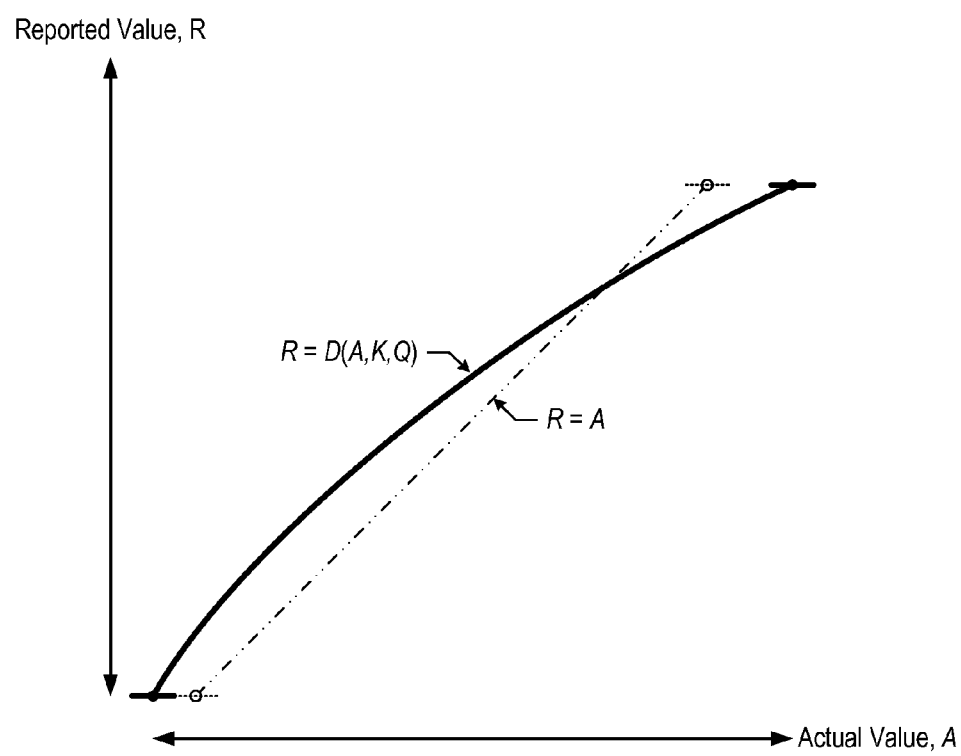

In contrast, most real-world radios do not perfectly measure the traits of the signals they receive. This is particularly true for measurements of signal-strength where the errors can be large. For example, FIG. 8b depicts a graph of the distortion function of an illustrative real-world radio. In this case, the reported measurement is too high for some values, too low for others, and correct for only one value.

The nature and magnitude of each of the errors in the reported measurements is inherent in the distortion function D(A,K,Q), and, therefore, knowledge of the distortion function enables the measurement errors to be compensated for. In other words, when location server 214 knows exactly how a radio distorts a measurement, it can correct—or calibrate—the reported measurement with a calibration function to derive the actual value of the trait. The calibration function, denoted C(R,K,Q), is generated in process 1102.

In accordance with the illustrative embodiment, the distortion function D(A,K,Q) for all measurements is represented in tabular form. For example, the distortion function for one type of signal-strength measurement for various radios is shown in Table 1. It will be clear to those skilled in the art, after reading this disclosure, however, how to make and use alternative embodiments of the present invention in which the distortion function for some or all measurements is not represented in tabular form. Furthermore, it will be clear to those skilled in the art, after reading this disclosure, how to make and use alternative embodiments of the present invention that comprise distortion functions for any type of measurement of any type of trait and for any radio.

TABLE 1

The Distortion function D(A, K, Q) in Tabular Form

R = D(A, K, Q)

| A | K = Motorola Model A008; Q = Signal Strength | ... | K = Samsung Model A800; Q = Signal Strength |
|---|---|---|---|
| −110 | −115 | ... | −107 |
| −109 | −114 | ... | −106 |
| ... | ... | ... | ... |
| −48 | −38 | ... | −50 |
| −47 | −37 | ... | −49 |

The purpose of the characteristic, K, is to identify which calibration function should be used in calibrating the reported measurements from wireless terminal 201, and, therefore, the characteristic, K, should be as indicative of the actual distortion function for wireless terminal 201 as is economically reasonable.

For example, the characteristic, K, can be, but is not limited to:

i. the unique identity of wireless terminal 201 (e.g., its electronic serial number ("ESN"), its international mobile station identifier ("IMSI"), its temporary international mobile station identifier ("TIMSI"), mobile station identification ("MSID"), its directory number ("DN"), etc.); or ii. the model of wireless terminal 201 (e.g., Timeport 210c, etc.); or iii. the make (i.e., manufacturer) of wireless terminal 201 (e.g., Motorola, Samsung, Nokia, etc.); or iv. the identity of the radio-frequency circuitry of wireless terminal 201 (e.g., Motorola RF circuit design 465B, etc.); or v. the identity of one or more components of wireless terminal 201 (e.g., the part number of the antenna, the part number of the measuring component, etc.); or viii. any combination of i, ii, iii, iv, v, vi, and vii.

The most accurate characteristic is the unique identity of wireless terminal 201 because that would enable location server 214 to use the calibration function generated for that very wireless terminal. It is unlikely, however, that this is economically feasible because it would require that every wireless terminal be tested to determine its own unique distortion function.

On the other hand, using only the make of wireless terminal 201 as the characteristic, K, is economically reasonable, but it is unlikely that a single calibration function for all of a manufacturer's wireless terminals would provide very accurate calibrated signal-strength measurements.

As a compromise, the illustrative embodiment uses the combination of make and model of wireless terminal 201 as the characteristic, K, because it is believed that the amount of variation between wireless terminals of the same make and model will be small enough that a single calibration function for that model should provide acceptably accurate calibrated measurements for every wireless terminal of that make and model.

It will be clear to those skilled in the art, however, after reading this disclosure, how to make and use alternative embodiments of the present invention in which the characteristic, K, is based on something else.

In accordance with process 502, the calibration function C(R,K,Q) is generated for every radio that might provide measurements to location server 214 and for every trait whose measurements can be distorted.

In general, the calibration function C(R,K,Q) relates the calibrated measurement S of a trait Q, to the reported measurement R of trait Q and the defining characteristic K of the radio making the measurement:

$$S=D(R,K,Q) \quad \text{(Eq. 2)}$$

Figure 8C:
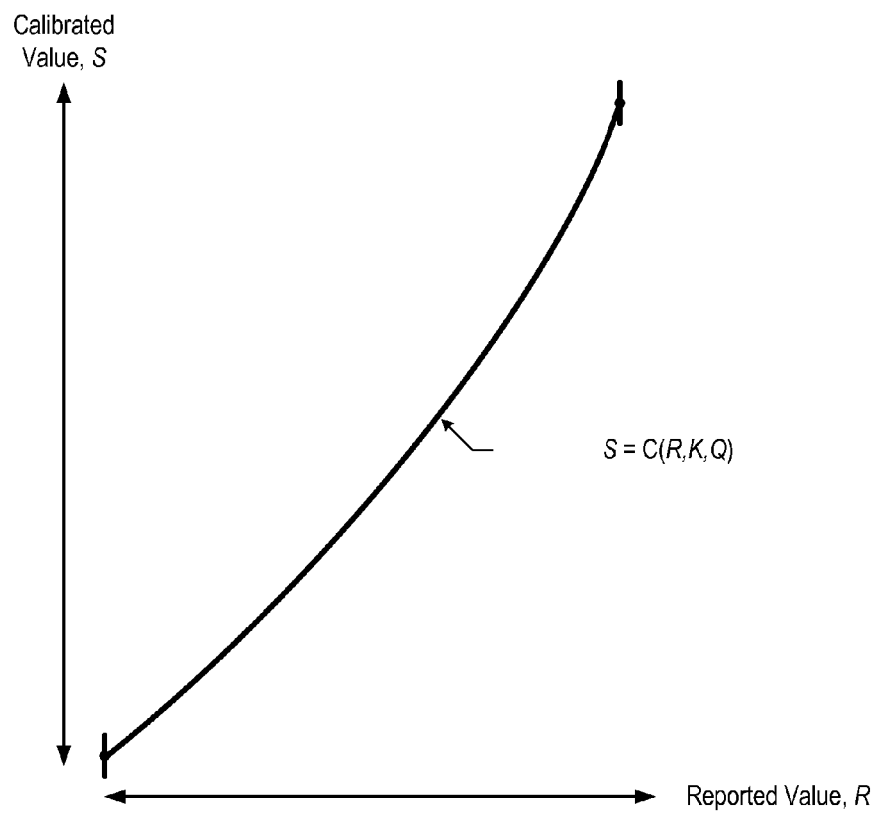

The calibration function C(R,K,Q) is the inverse of the distortion function D(A,K,Q). In other words, the salient characteristic of the calibration function C(R,K,Q) is that it satisfies the equation 3:

$$S=A=C(D(A,K,Q),K,Q) \quad \text{(Eq. 3)}$$

so that the calibrated measurement, S, is what the reported measurement, R, would have been had the radio making and reporting the measurement been ideal. It will be clear to those skilled in the art, after reading this disclosure, how to derive C(R,K,Q) from D(A,K,Q). FIG. 8c depicts a graph of the calibration function C(R,K,Q) for the distortion function D(A,K,Q) depicted in FIG. 8b.

In accordance with the illustrative embodiment, the function C(R,K,Q) is represented in tabular form, such as that shown in Table 2.

TABLE 2

The Calibration Function C(R, C, N) in Tabular Form

S = C(R, C, N)

| R | C = Motorola Model A008; Q = Signal Strength | ... | C = Samsung Model A800; Q = Signal Strength |
|---|---|---|---|
| −110 | −115 | ... | −107 |
| −109 | −114 | ... | −106 |
| ... | ... | ... | ... |
| −48 | −38 | ... | −50 |
| −47 | −37 | ... | −49 |

In accordance with process 402, the calibration functions C(R,K,Q) are stored in Trait-Corrections Database 313.

Figure 9:
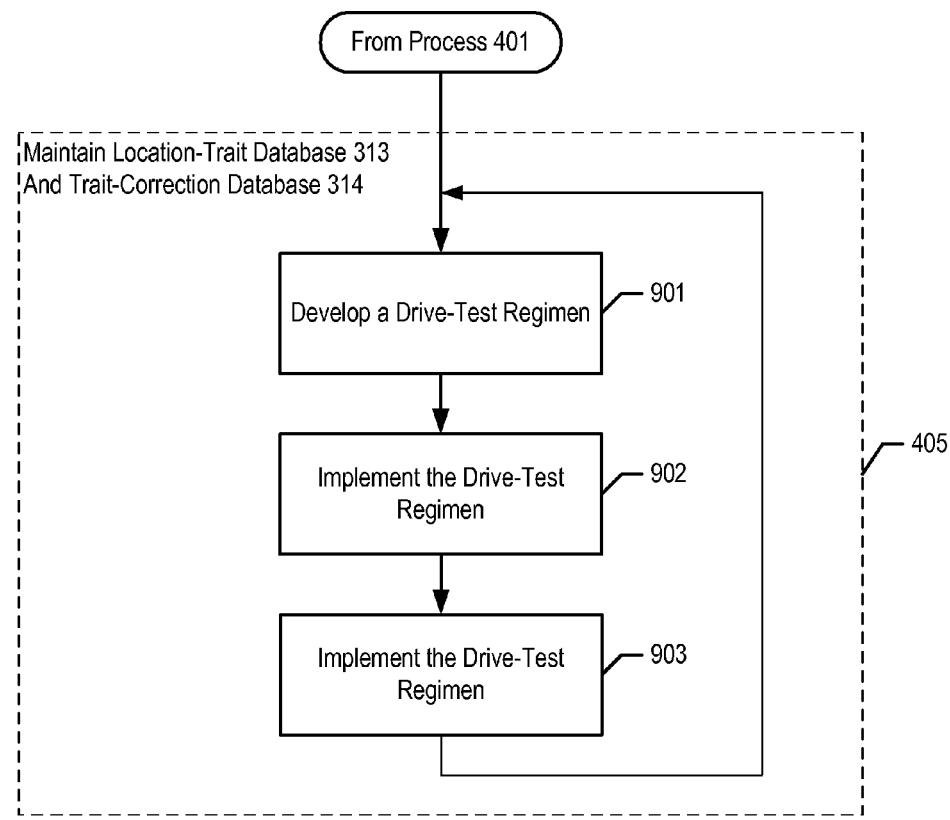
FIG. 9 depicts a flowchart of the salient processes performed in process 403 (of FIG. 4): maintaining Location-Trait Database 313.

Maintaining Location-Trait Database 313—FIG. 9 depicts a flowchart of the salient processes performed in process 403: maintaining Location-Trait Database 313 and Trait-Corrections Database 314. The ability of the illustrative embodiment to function is based on—and limited by—the accuracy, freshness, and completeness of the information contained in Location-Trait Database 313 and Trait-Corrections Database 314.

In accordance with process 901, a drive-test regimen is developed that periodically makes empirical measurements throughout geographic region 220 with highly-accurate equipment to ensure the accuracy, freshness, and completeness of the information contained in Location-Trait Database 313 and Trait-Corrections Database 314.

In accordance with process 902, the drive-test regimen is implemented.

In accordance with process 903, Location-Trait Database 313 and Trait-Corrections Database 314 are updated, as necessary.

Figure 10:
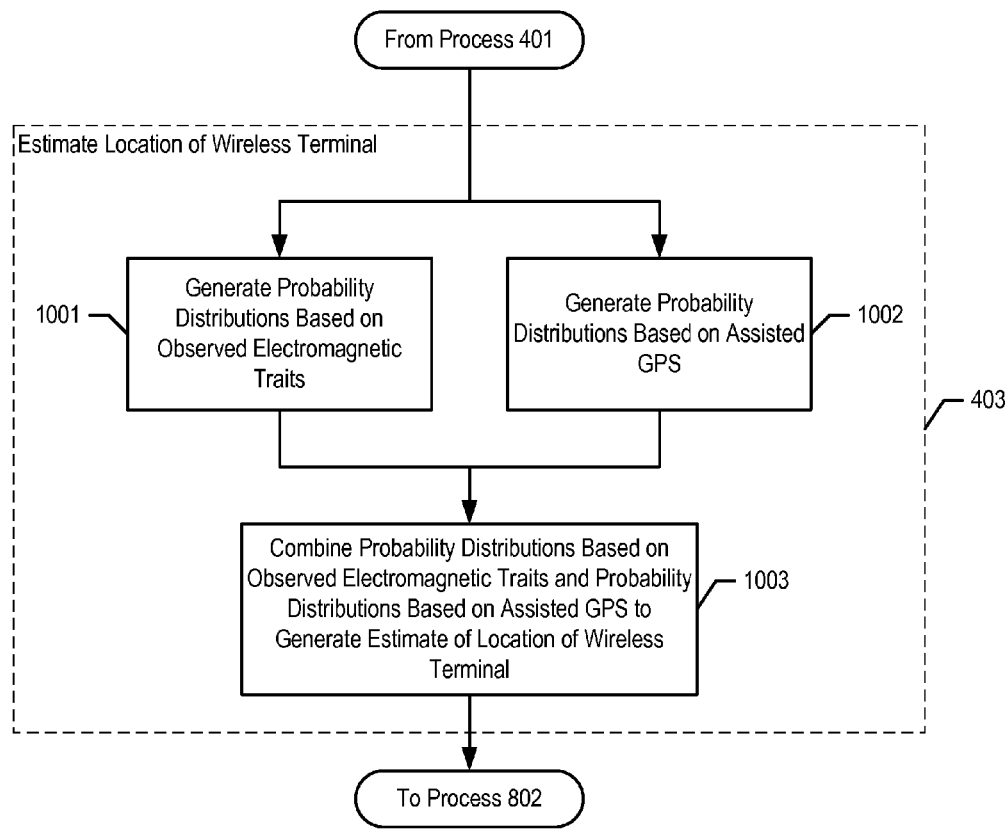
FIG. 10 depicts a flowchart of the salient processes performed in process 701 of FIG. 7: estimating the location of wireless terminal 201.

Estimating the Location of Wireless Terminal 201—FIG. 10 depicts a flowchart of the salient processes performed in process 403: estimating the location of wireless terminal 201. In accordance with the illustrative embodiment, process 403 is initiated by a request from location client 213 for the location of wireless terminal 201. It will be clear to those skilled in the art, however, after reading this disclosure, how to make and use alternative embodiments of the present invention in which process 403 is initiated periodically, sporadically, or in response to some other event.

In accordance with process 1001, Y probability distributions for the location of wireless terminal 201 are generated for each of instants $H_1$ through $H_Y$ in the temporal interval $\Delta T$, wherein Y is a positive integer, based on comparing the measurements of traits associated with wireless terminal 201 at each of instants $H_1$ through $H_Y$ to expected values for those traits at those times. Each of the Y probability distributions provides a first estimate of the probability that wireless terminal 201 is in each location at each of instants $H_1$ through $H_Y$. The details of process 1001 are described below and in the accompanying figures.

In accordance with process 1002, Z probability distributions for the location of wireless terminal 201 are generated for each of instants $A_1$ though $A_Z$ in the temporal interval $\Delta T$, wherein Z is a positive integer, based on Assisted GPS measurements at wireless terminal 201 at each of instants $A_1$ though $A_Z$. Each of the Z probability distributions provides a first estimate of the probability that wireless terminal 201 is in each location at each of instants $A_1$ though $A_Z$. The details of process 1002 are described below and in the accompanying figures.

In accordance with process 1003, the Y probability distributions generated in process 1001 and the Z probability distributions generated in process 1002 are combined, taking into account their temporal order, to generate a second estimate of the location of wireless terminal 201. The details of process 1003 are described below and in the accompanying figures.

Figure 11A:
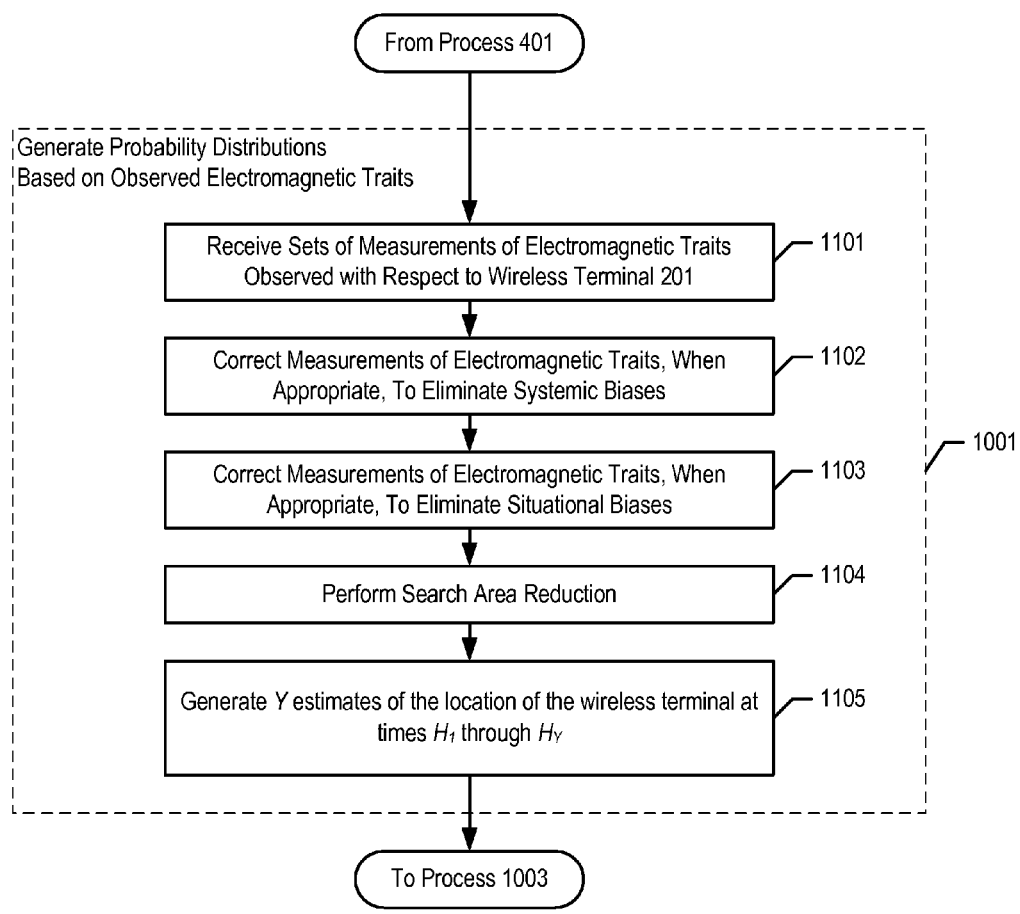
FIG. 11a depicts a flowchart of the salient processes performed in process 901 of FIG. 9: generating the probability distribution for the location of wireless terminal 201 based on the traits of one or more signals received by, or transmitted to, wireless terminal 201 at instants $H_1$ through $H_Y$.

Generating the Probability Distributions for the Location of Wireless Terminal 201 Based on Pattern Matching of Traits—FIG. 11a depicts a flowchart of the salient processes performed in process 1001—generating the Y probability distributions for the location of wireless terminal 201 based on comparing the measurements of traits associated with wireless terminal 201 at each of instants $H_1$ through $H_Y$ to expected values for those traits at those times. In accordance with the illustrative embodiment, location server 214 performs each of processes 1101 through 1105 as soon as the data necessary for performing the process becomes available to it.

In accordance with process 1101, location server 214 receives Y non-empty sets of measurements of the traits, $M_1$ though $M_Y$, associated with wireless terminal 201. Each set of measurements is made at one of instants $H_1$ through $H_Y$.

In accordance with the illustrative embodiment, each set of measurements comprises:

i. the pathloss of all of the signals received by wireless terminal 201 from all transmitters (e.g., base stations 202-1, 202-2, and 202-3, commercial television, commercial radio, navigation, ground-based aviation, etc.); and ii. the pathloss of all of the signals transmitted by wireless terminal 201 as received at base stations 202-1, 202-2, and 202-3; and iii. the received signal strength of all of the signals received by wireless terminal 201 from all transmitters; and iv. the received signal strength of all of the signals transmitted by wireless terminal 201 as received at base stations 202-1, 202-2, and 202-3; and v. the received signal-to-impairment ratio of all of the signals received by wireless terminal 201 from all transmitters; and vi. the received signal-to-impairment ratio of all of the signals transmitted by wireless terminal 201 as received at base stations 202-1, 202-2, and 202-3; and vii. the received temporal difference of each pair of multipath components of all of the signals received by wireless terminal 201 from all transmitters; and viii. the received temporal difference of each pair of multipath components of all of the signals transmitted by wireless terminal 201 as received at base stations 202-1, 202-2, and 202-3; and ix. the received delay spread of all of the signals received by wireless terminal 201 from all transmitters; and x. the received delay spread of all of the signals transmitted by wireless terminal 201 as received at base stations 202-1, 202-2, and 202-3; and xi. the received relative arrival times of two or more multipath components of all of the signals received by wireless terminal 201 from all transmitters; and xii. the received relative arrival times of two or more multipath components of all of the signals transmitted by wireless terminal 201 as received at base stations 202-1, 202-2, and 202-3; and xiii. the round-trip time of all of the signals transmitted and received by wireless terminal 201 through base stations 202-1, 202-2, and 202-3; and xiv. the round-trip time of all of the signals transmitted as received at base stations 202-1, 202-2, and 202-3 through wireless terminal 201; and xv. the identity of the base stations that provide telecommunications service to wireless terminal 201; and xvi. the identities of the neighboring base stations that can provide telecommunications service to wireless terminal 201; and xvii. the handover state (e.g., soft, softer, 1×, 2×, etc.) of wireless terminal 201 and wireless telecommunication system 200; and xviii. an indication of the calendrical time, T; and xix. an indication of the environmental conditions, N.

In accordance with the illustrative embodiment, wireless terminal 201 provides its measurements directly to location server 214 via the user plane and in response to a request from location server 214 to do so. This is advantageous because the quality of the estimate of the location of wireless terminal 201 is enhanced when there are no limitations on the nature, number, or dynamic range of the measurements—as might occur when measurements are required to be made in accordance with the air-interface standard. It will be clear to those skilled in the art, however, after reading this disclosure, how to make and use alternative embodiments of the present invention in which wireless terminal 201 provides its measurements periodically, sporadically, or in response to some other event. Furthermore, it will be clear to those skilled in the art, after reading this disclosure, how to make and use alternative embodiments of the present invention in which wireless terminal 201 provides its measurements to location server 214 via the UMTS protocol.

In accordance with the illustrative embodiment, base stations 202-1, 202-2, and 202-3 provide their measurements to location server 214 via wireless switching center 211 and in response to a request from location server 214 to do so. It will be clear to those skilled in the art, however, after reading this disclosure, how to make and use alternative embodiments of the present invention in which base stations 202-1, 202-2, and 202-3 provide their measurements to location server 214 periodically, sporadically, or in response to some other event.

As part of process 1101, location server 214 also receives from wireless terminal 201:

i. the identities of the base stations that provided service to wireless terminal 201 at each of instants $H_1$ through $H_Y$, and ii. the identities of the neighboring base stations that provided service to the location of wireless terminal 201 at each of instants $H_1$ through $H_Y$.

This information is used by location server 214 in performing search area reduction, which is described in detail below.

In accordance with process 1102, location server 214 uses the calibration functions C(R,K,Q) in the Trait-Corrections Database 314 to correct the systemic errors in the measurements received in process 1001.

In accordance with process 1103, location server 214 computes the differentials, in those cases that are appropriate, of the measurements to correct the situational errors in the measurements received in process 1001. Many factors, including the condition of wireless terminal 201's antenna, the state of its battery, and whether or not the terminal is inside a vehicle can introduce situational measurement errors. This is particularly true for measurements of pathloss and signal strength.

The illustrative embodiment ameliorates the effects of these factors by pattern matching not the measurements themselves—whether corrected in process 1102 or not—to the expected values for those traits, but by pattern matching the pair-wise differentials of those measurements to the pair-wise differentials of the expected values for those traits. It will be clear to those skilled in the art, after reading this disclosure, how to make and use alternative embodiments of the present invention in which different measurements are corrected for situational errors by the use of pair-wise differentials.

A simple example involving signal strengths illustrates this approach. A first radio station, Radio Station A, can be received at −56 dBm at Location 1, −42 dBm at Location 2, −63 dBm at Location 3, and −61 dBm at Location 4, and a second radio station, Radio Station B, can be received at −63 dBm at Location 1, −56 dBm at Location 2, −65 dBm at Location 3, and −52 dBm at Location 4. This information is summarized in the table below and forms the basis for a map or database that correlates location to signal strength.

TABLE 3

Illustrative Location-Trait Database (Differential Reception)

| | Radio Station A | Radio Station B | Difference |
|---|---|---|---|
| Location 1 | −56 dBm | −63 dBm | −7 dB |
| Location 2 | −42 dBm | −56 dBm | −14 dB |
| Location 3 | −63 dBm | −65 dBm | −2 dB |
| Location 4 | −61 dBm | −52 dBm | 9 dB |

If a given wireless terminal with a broken antenna and at an unknown location receives Radio Station A at −47 dBm and Radio Station B at −61 dBm, then it registers Radio Station A as 14 dBm stronger than Radio Station B. This suggests that the wireless terminal is more likely to be at Location 2 than it is at Location 1, 3, or 4. If the measured signal strengths themselves were pattern matched into Location-Trait Database 313, the resulting probability distribution for the location of wireless terminal 201 might not be as accurate.

A disadvantage of this approach is that the situational bias is eliminated at the expense of (1) doubling the variance of the random measurement noise, and (b) reducing the number of data points to pattern match by one. Furthermore, the pairwise subtraction introduces correlation into the relative signal strength measurement errors (i.e., all of the data points to be matched are statistically correlated). It will be clear to those skilled in the art how to account for this correlation in calculating the likelihood of the measurement report.

In accordance with process 1104, location server 214 performs a technique called "search area reduction" in preparation for process 1105. To understand what search area reduction is and why it is advantageous, a brief discussion of process 1105 is helpful. In process 1105 location server 214 estimates the probability that wireless terminal 201 is in each location at each of instants $H_1$ through $H_Y$. This requires generating Y multi-dimensional probability distributions, one for each of instants $H_1$ through $H_Y$.

The process for generating each multi-dimensional probability distribution can be computationally intensive and the intensity depends on the number of locations that must be considered as possible locations for wireless terminal 201. When the number of locations that must be considered is small, the process can be performed quickly enough for many "real-time" applications. In contrast, when the number of locations that must be considered is large, the process can often take too long.

Nominally, all of the locations in geographic region 220 must be considered because, prior to process 1104, wireless terminal 201 could be in any location. In accordance with the illustrative embodiment, geographic region 220 comprises only 28 locations. In many alternative embodiments of the present invention, however, geographic region 220 comprises thousands, millions, or billions of locations. The consideration of thousands, millions, or billions of locations for each instant by location server 214 might take too long for many real-time applications.

Therefore, to expedite the performance of process 1105, location server 214 performs some computationally-efficient tests that quickly and summarily eliminate many possible locations for wireless terminal 201 from consideration, and, therefore, summarily set to zero the probability that wireless terminal 201 is at those locations. This reduces the number of locations that must be fully considered in process 1105 and generally improves the speed with which process 1001 is performed.

In accordance with search area reduction, for each of instants $H_1$ through $H_Y$ location server 214 uses six computationally efficient tests in an attempt to designate one or more locations as improbable locations for wireless terminal 201. A location that is designated as improbable by one or more of the six tests at instant $H_i$ is designated as improbable by process 1104 at instant $H_i$. To the extent that a location is designated as improbable at instant $H_i$, the computational burden on location server 214 of generating the probability distribution for that instant is reduced.

There are two types of errors that can be made by process 1104. The first type of error—a Type I error—occurs when process 1104 designates a location as improbable when, in fact, it is not improbable for wireless terminal 201 to be in that location. The second type of error—a Type II error—occurs when process 1104 fails to designate a location as improbable when, in fact, it is improbable that wireless terminal 201 is in that location.

In general, a Type I error affects the accuracy with which the illustrative embodiment can estimate the location of wireless terminal 201, and a Type II error affects the speed with which processor 1104 can generate the probability distributions. In accordance with the illustrative embodiment, the tests and their parameters are chosen to balance the number of Type I and Type II errors with the computational complexity and value of process 1104. For example, when there are too many Type II errors, the value of process 1104 is undermined by the computational burden of process 1104. It will be clear to those skilled in the art, after reading this disclosure, how to make and use alternative embodiments of the present invention that have any number of Type I and Type II errors.

Figure 11B:
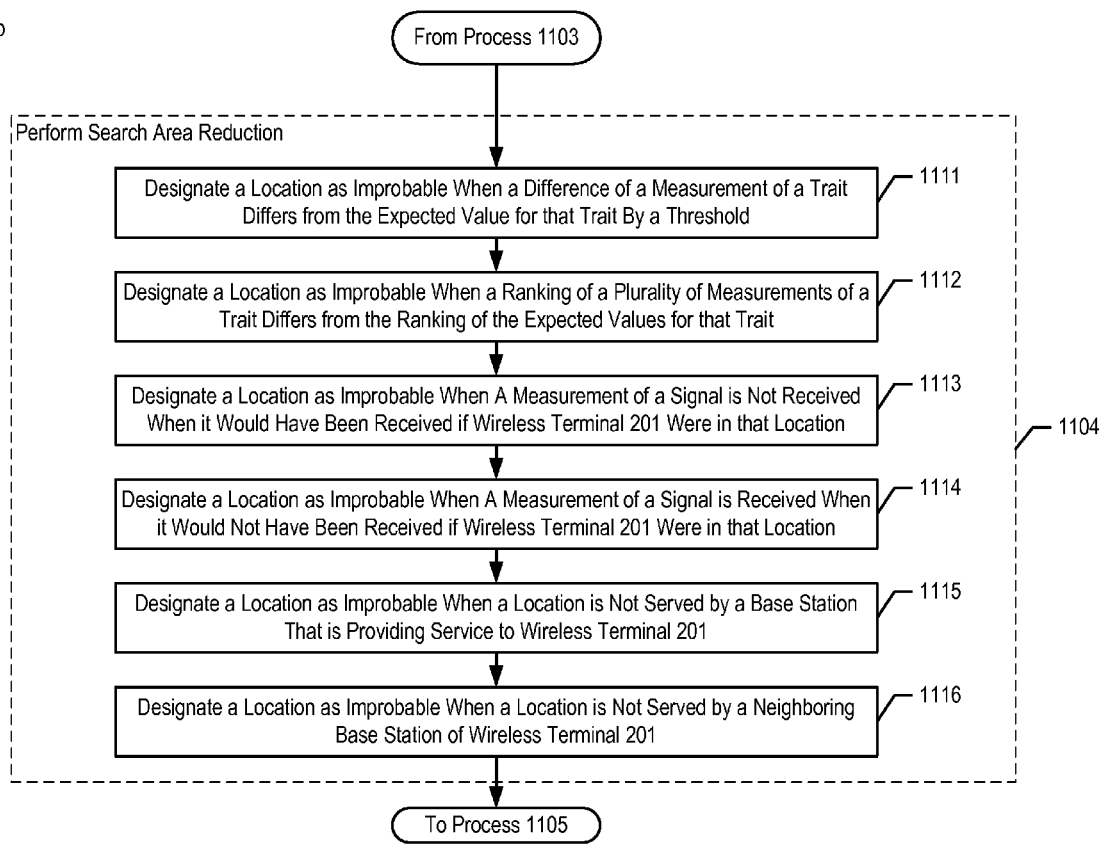
FIG. 11b depicts a flowchart of the salient processes performed in accordance with process 1104 of FIG. 11a: search area reduction.

FIG. 11b depicts a flowchart of the salient processes performed in accordance with process 1104: search area reduction.

In accordance with process 1111, location server 214 designates a location as improbable when the difference between a measured value of a trait and the expected value of that trait at that location exceeds a threshold. The theory underlying this test is that a major discrepancy between a measurement of a trait and the expected value of a trait at a location suggests that the measurement was not made when wireless terminal 201 was in that location. In accordance with the illustrative embodiment, location engine 214 performs process 1111 on each measured value of each trait for each signal for each of instants $H_1$ through $H_Y$. It will be clear to those skilled in the art, after reading this disclosure, how to choose the traits and signals and thresholds to achieve the desired number of Type I and Type II errors. It will be clear to those skilled in the art, after reading this disclosure, how to make and use alternative embodiments of the present invention that omit process 1111 or that omit testing one or more traits and/or one or more signals in process 1111.

In accordance with process 1112, when the magnitude of two measurements of a trait at one instant exceed a first threshold and the magnitude of the expected values for that trait at a location exceed a second threshold, location server 214 designates that location as improbable when a ranking of the two measurements differs from a ranking of the expected values. The theory underlying this test is that a major discrepancy between the ranking of the measurements of a trait and the ranking of the expected values of that trait in the location suggests that the measurements were not made when wireless terminal 201 was in that location. In accordance with the illustrative embodiment, location engine 214 performs process 1112 on each pair of measurements of each trait for each of instants $H_1$ through $H_Y$. It will be clear to those skilled in the art, after reading this disclosure, how to choose the traits and signals and thresholds to achieve the desired number of Type I and Type II errors. It will be clear to those skilled in the art, after reading this disclosure, how to make and use alternative embodiments of the present invention that omit process 1112 or that omit testing one or more traits and/or one or more signals in process 1112.

In accordance with process 1113, location server 214 designates a location as improbable when a measurement of traits of a signal is not received when it is expected if wireless terminal 201 were, in fact, in that location. In accordance with the illustrative embodiment, location engine 214 performs process 1113 on each trait of each expected signal for each of instants $H_1$ through $H_Y$. This test is highly prone to Type I errors and should be used judiciously. It will be clear to those skilled in the art, after reading this disclosure, how to make and use alternative embodiments of the present invention that omit process 1113 or that omit testing one or more traits and/or one or more signals in process 1113.

In accordance with process 1114, location sever 214 designates a location as improbable when a measurement of a trait of a signal is received when it is not expected if wireless terminal 201 were, in fact, in that location. In accordance with the illustrative embodiment, location engine 214 performs process 1114 on each trait of each signal for each of instants $H_1$ through $H_Y$. In general, this test is less prone to Type I errors than the test in process 1113. It will be clear to those skilled in the art, after reading this disclosure, how to make and use alternative embodiments of the present invention that omit process 1114 or that omit testing one or more traits and/or one or more signals in process 1114.

In accordance with process 1115, location server 214 designates a location as improbable when the location is not provided wireless telecommunications service by a base station that is known to be providing service to wireless terminal 201 at that instant. The theory underlying this test is that if a base station that provided telecommunications service to wireless terminal 201 at that instant does not provide service to the location, then it suggests that wireless terminal 201 is not in that location at that instant. In general, this test is highly accurate and has a low number of both Type I and Type II errors. It will be clear to those skilled in the art, after reading this disclosure, how to make and use alternative embodiments of the present invention that omit process 1115.

In accordance with process 1116, location server 214 designates a location as improbable designating a possible location as improbable when the location is not within the neighboring coverage area of a base station that is known to be a neighboring base station of wireless terminal 201. The theory underlying this test is that if a location is not within the neighboring coverage area of a base station that is a neighbor of wireless terminal 201 at that instant, then it suggests that wireless terminal 201 is not in the location at that instant. In general, this test is highly accurate and has a low number of both Type I and Type II errors. It will be clear to those skilled in the art, after reading this disclosure, how to make and use alternative embodiments of the present invention that omit process 1116.

A location that that is designated as improbable at instant $H_j$ by one or more of processes 1111 through 1116 is designated as improbable by process 1104 at instant $H_i$.

In accordance with process 1105, location server 214 generates each of the Y probability distribution for that wireless terminal 201 at each of instants $H_1$ through $H_Y$. To accomplish this, location server 214 performs the processes described below and in FIG. 11c.

Figure 11C:
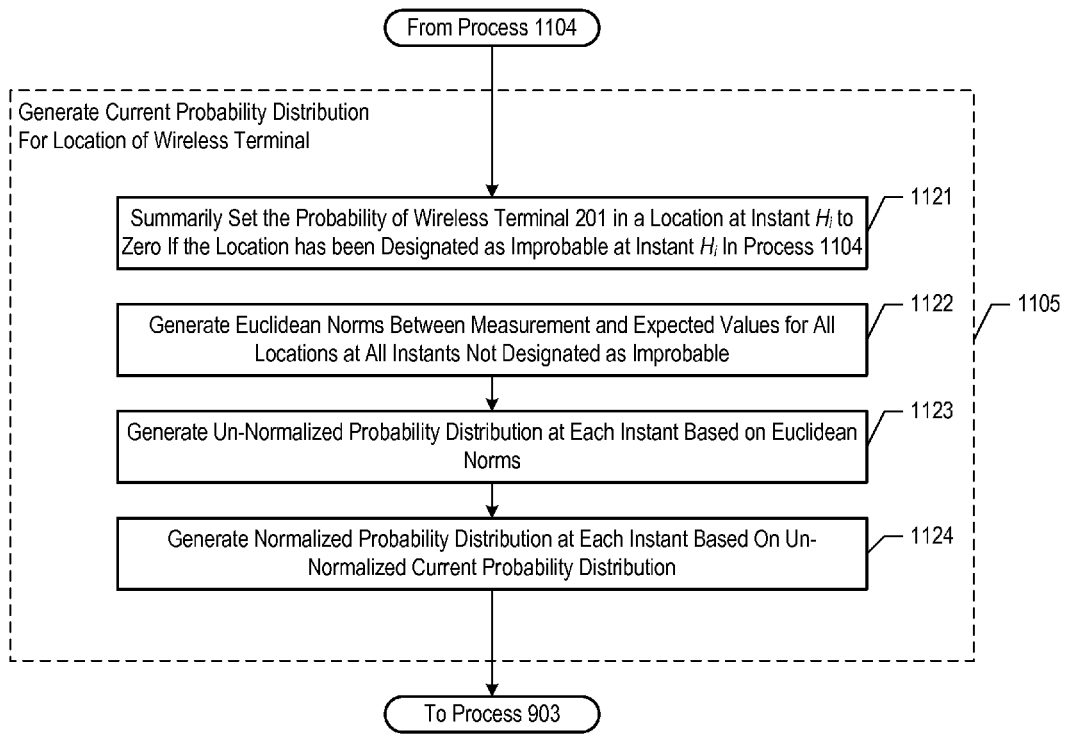
FIG. 11c depicts a flowchart of the salient processes performed in accordance with process 1105: generating the probability distribution for that wireless terminal 201 at each of instants $H_1$ through $H_Y$.

FIG. 11c depicts a flowchart of the salient processes performed in accordance with process 1105: generating the Y probability distribution for that wireless terminal 201 at each of instants $H_1$ through $H_Y$.

In accordance with process 1121, location server 214 sets the probability of wireless terminal 201 being at a location at instant $H_i$ to zero (0) if the location was designated as improbable at instant $H_i$ by process 1104.

In accordance with process 1122, location server 214 generates the Euclidean norm between the measurements of a trait and the expected values for that trait at all instants and for all locations not designated as improbable by process 1104. To accomplish this, the Euclidean norm is generated between the measurements (as corrected in process 1102, if necessary and/or the differentials of measurements as the case may be) of the expected values for those traits in Location-Trait Database 313. To accomplish this, the Euclidean norm is generated as described in Equation 4:

$$V(b, H_i) = \sqrt{\Sigma((E(b,H_i,N,W,Q) - M(b,H_i,N,W,Q)) \cdot \omega(Q))^2} \quad \text{(Eq. 4)}$$

wherein $V(b,H_i)$ is the Euclidean norm for Location b at instant $H_i$ based on the square root of the sum of the square of the differences between each (corrected and differential, where appropriate) trait measurement $M(b, H_i, N, W, Q)$ minus the expected value $E(b, H_i, N, W, Q)$ for that trait, where $\omega(Q)$ is a weighting factor that indicates the relative weight to be given discrepancies in one trait versus discrepancies in the other traits.

At accordance with process 1123, the un-normalized probabilities of the location of wireless terminal 201 at each location are generated based on the Euclidean norms generated in process 1122 as shown in Equation 5.

$$UP(b, H_i) = e^{\left(\frac{-V^2(b,H_i)}{\delta^2}\right)} \quad \text{(Eq. 5)}$$

wherein $UP(b,H_i)$ represents the un-normalized probability that wireless terminal 201 is in Location b at instant $H_i$, and wherein $\delta^2$ equals:

$$\delta^2 = \delta_E^2 + \delta_M^2 \quad \text{(Eq. 6)}$$

wherein $\delta_E^2$ is the square of the uncertainty in the error in Location-Trait Database and $\delta_M^2$ is the square of the uncertainty in the calibrated measurements. It will be clear to those skilled in the art, after reading this disclosure, how to generate $\delta^2$.

At process 1124, the probabilities generated in process 1123 are normalized as described in Equation 7.

$$NP(b, H_i) = \frac{UP(b, H_i)}{\Sigma UP(b, H_i)} \quad \text{(Eq. 7)}$$

wherein $NP(b,H_i)$ represents the normalized probability that wireless terminal 201 is in Location b.

As part of process 1124, location server 214 generates a preliminary estimate of the location of wireless terminal 201 at instant $H_1$ based on the maximum likelihood function of the normalized probability distribution at instant $H_1$.

Figure 12:
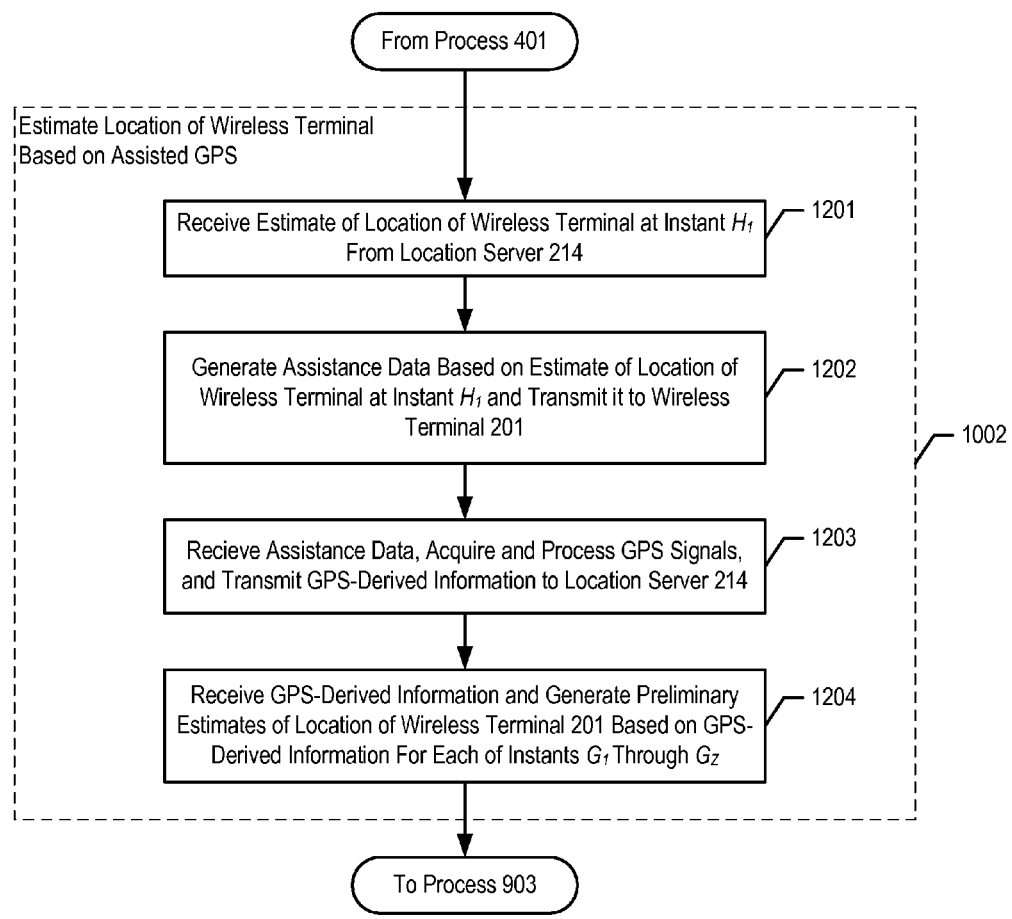
FIG. 12 depicts a flowchart of the salient processes performed in process 902 of FIG. 9: generating the probability distribution for the location of wireless terminal 201 based on GPS-derived information (i.e., information from GPS constellation 221).

Generating the Probability Distributions for the Location of Wireless Terminal 201 Based on Assisted GPS—FIG. 12 depicts a flowchart of the salient processes performed in process 1002: generating the Z probability distributions for the location of wireless terminal 201 based on GPS-derived information (i.e., information from GPS constellation 221).

In accordance with processes 1124 and 1201, location server 214 transmits, and assistance server 212 receives, the preliminary estimate of the location of wireless terminal 201 at instant $H_1$ as generated in process 1105.

In accordance with process 1202, assistance server 212 generates assistance data for wireless terminal 201 based on the preliminary estimate of the location of wireless terminal 201 at instant $H_1$. In accordance with the illustrative embodiment, assistance server 212 generates "fully-custom" assistance data based on the estimate of the location of wireless terminal 201 at instant $H_1$. The assistance data is "fully-custom" because it is specifically tailored to the estimated location of wireless terminal 201 at instant $H_1$. It will be clear to those skilled in the art how to generate fully-custom assistance data for wireless terminal 201 based on the estimated location of wireless terminal 201 at instant $H_1$. As part of process 1202, assistance server 212 transmits the assistance data to wireless terminal 201 via wireless switching center 212 in well-known fashion.

In accordance with some alternative embodiments of process 1202, assistance server 212 pre-computes assistance data for a plurality of diverse locations within geographic region 220 and selects that pre-computed assistance data for wireless terminal 201 based on the estimated location of wireless terminal 201 at instant $H_1$. Because the assistance data selected for wireless terminal 201 is not specifically tailored to the estimated location of wireless terminal 201 at instant $H_1$, nor generic to all of geographic region 220 or to the cell or sector of the base station serving wireless terminal 201, it is deemed "semi-custom" assistance data. In general, semi-custom assistance data is less accurate than fully-custom assistance data, but more accurate, on average, than generic assistance data, which is chosen based on cell ID alone and that is based on one location within geographic region 220. It will be clear to those skilled in the art, after reading this disclosure, how to generate the fully-custom and semi-custom assistance data for wireless terminal 201.

In accordance with process 1203, wireless terminal 201 (a) receives the assistance data from assistance server 212, in well-known fashion, (b) uses it to facilitate the acquisition and processing of one or more GPS satellite signals in well-known fashion, and (c) transmits Z non-empty sets of GPS-derived information to location server 214 for readings at instants $G_1$ through $G_Z$, where Z is a positive integer. In accordance with the illustrative embodiment of the present invention, each set of GPS-derived information comprises:
  i. a GPS-derived estimate of the location of wireless terminal 201 (e.g., a latitude, longitude, and altitude coordinate, etc.), or
  ii. ranging data (e.g., PRN code phase, etc.) from one or more GPS satellites, or
  iii. partially-processed ranging signals (e.g., signals from which the ranging data has not yet been extracted, etc.) from one or more GPS satellites, or
  iv. any combination of i, ii, and iii.

In accordance with process 1204, location server 214 receives Z non-empty sets of GPS-derived information to location server 214 for readings at instants $G_1$ through $G_Z$ and generates a probability distribution that indicates the likelihood that wireless terminal 201 is in each location at each of instants $G_1$ through $G_Z$. It will be clear to those skilled in the art how to perform process 1204.

Figure 13:
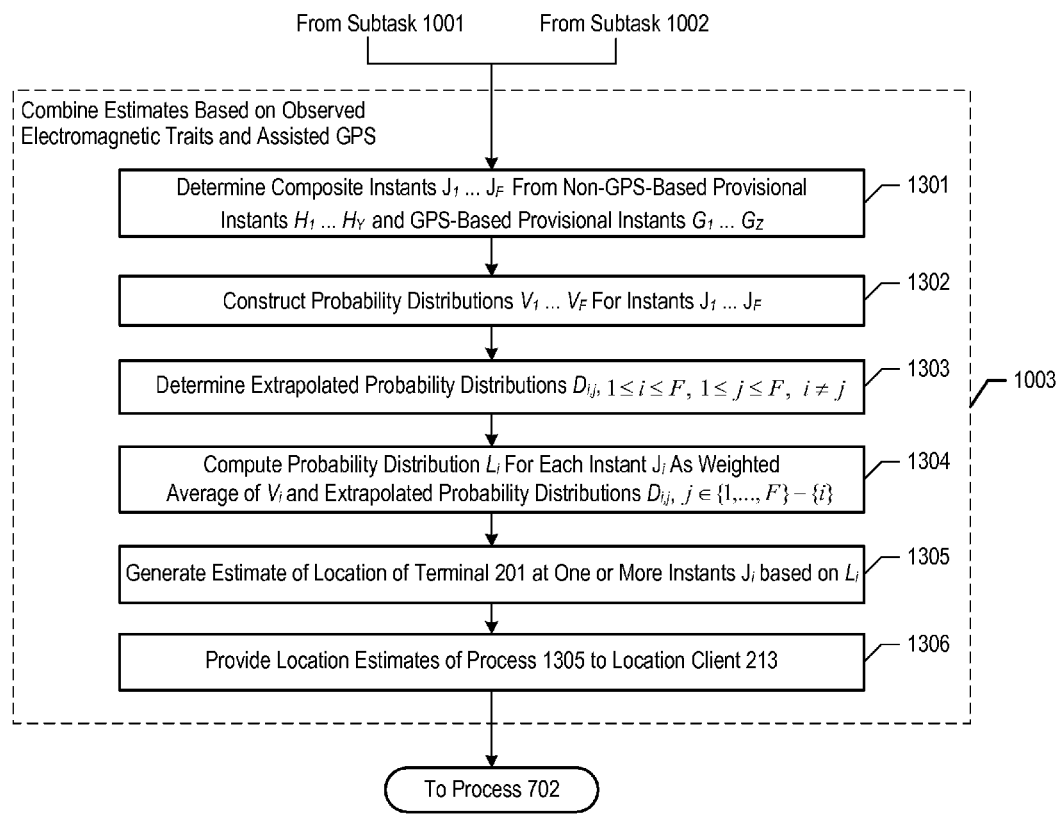
FIG. 13 depicts a flowchart of the salient processes performed in process 903 of FIG. 9: combining non-GPS-based and GPS-based probability distributions for the location of wireless terminal 201.

FIG. 13 depicts a flowchart of the salient processes performed in process 1003—combining the Y non-GPS-based probability distributions with the Z GPS-based probability distributions to derive F refined multi-dimensional probability distributions for the location of wireless terminal 201 at each of instants $J_1$ through $J_F$, where each $J_i$ corresponds to one of:
  i. a particular instant $H_y$, where $1 \leq y \leq Y$, or
  ii. a particular instant $G_z$, where $1 \leq z \leq Z$, or
  iii. a concurrence of both a particular instant $H_y$, and a particular instant $G_z$, where $1 \leq y \leq Y$ and $1 \leq z \leq Z$.

In other words, each "composite" instant $J_i$ corresponds to either an instant associated with a non-GPS-based probability distribution, or an instant associated with a GPS-based probability distribution, or an instant associated with both a non-GPS probability distribution and a GPS-based probability distribution.

In accordance with process 1003, the Y non-GPS-based probability distributions with the Z GPS-based probability distributions are intelligently combined, taking into consideration their relative temporal occurrence to derive a refined multi-dimensional probability distribution for the location of wireless terminal 201 at instants $J_1$ through $J_F$.

To generate the refined probability distribution for the location of wireless terminal 201 at instant $J_i$, the probability distributions that occur before instant $J_i$ are temporally-extrapolated progressively to instant $J_i$, the probability distributions that occur after instant $J_i$ are temporally-extrapolated regressively to instant $J_i$, and they all are combined with the un-temporally-extrapolated probability distribution for the location of wireless terminal 201 at instant $J_i$. In this way, the accuracy of all of the refined probability distributions for each instant $J_i$ are enhanced by the empirical data at other instants.

Figure 14:
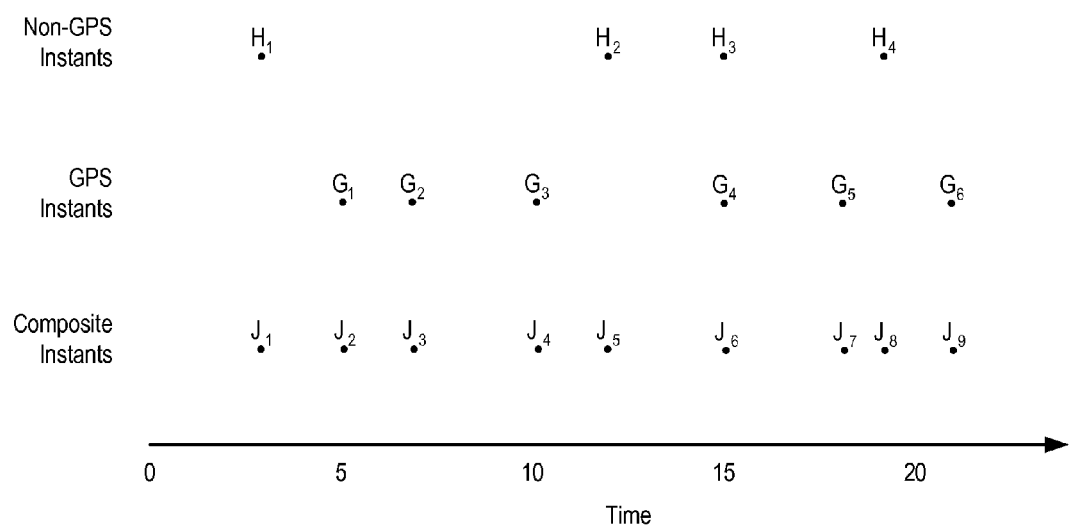
FIG. 14 depicts a first example of combining non-GPS-based instants $H_1$ through $H_Y$ and GPS-based instants $G_1$ through $G_Z$ into composite instants $J_1$ through $J_F$.

FIG. 14 depicts a first example of determining each of instants $J_1$ through $J_F$, based on non-GPS-based instants $H_1$ through $H_Y$, where Y=4, and GPS-based instants $G_1$ through $G_Z$, where Z=6. As can be seen in FIG. 14, the number of composite instants F is at most Y plus Z, and is at least the maximum of Y and Z—the former occurring when there are no coincident GPS/non-GPS probability distributions, and the latter when there are as many as possible coincident GPS/non-GPS probability distributions.

Figure 15:
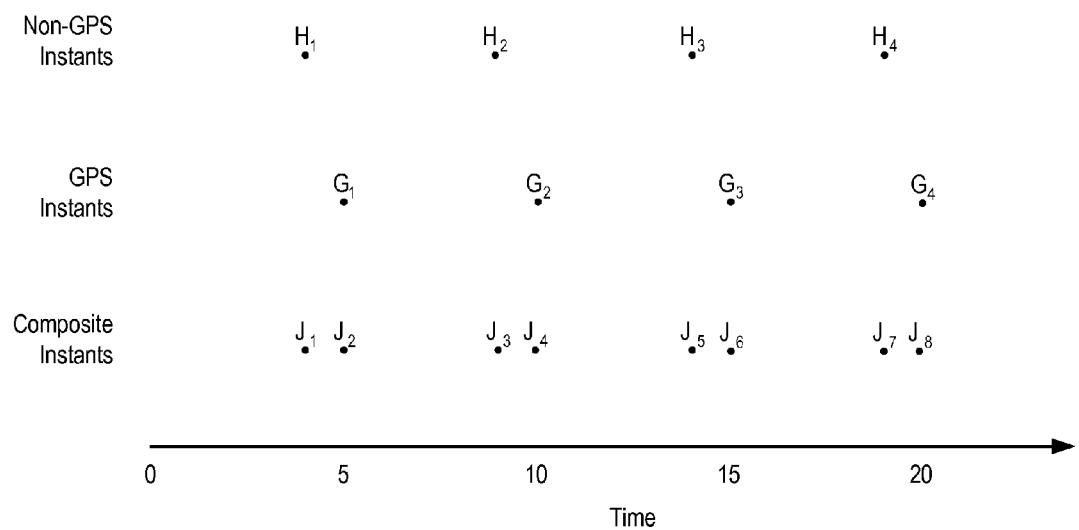
FIG. 15 depicts a second example of combining non-GPS-based instants $H_1$ through $H_Y$ and GPS-based instants $G_1$ through $G_Z$ into composite instants $J_1$ through $J_F$.

FIG. 15 depicts a second example of determining each of instants $J_1$ through $J_F$, based on non-GPS-based instants and GPS-based instants. This second example illustrates that even when the non-GPS-based instants are uniformly spaced in time and the GPS-based instants are uniformly spaced in time, the composite instants are not necessarily uniformly spaced in time.

In accordance with the present invention, the time step $\Delta t$ is defined as the minimum time interval between any two instants. The time step is atomic in that the time difference between any two instants is an integral multiple of time steps. (Note that two consecutive instants—whether they are non-GPS-based instants, GPS-based instants, or composite instants—might be more than a single time step apart.) The time step of the present invention is therefore similar to the time step employed in clock-driven discrete event simulations.

As will be appreciated by those skilled in the art, selecting an appropriate value for the time step $\Delta t$ typically will depend on the particular application, and involves a tradeoff between (1) temporal precision and (2) available memory and processing power. As will be further appreciated by those skilled in the art, after reading this disclosure, the selected time step can affect the definition of locations, the moving and staying probabilities, and consequently the graphs that are derived from them (e.g., the adjacency graph, etc.).

In accordance with process 1301, location server 214 determines instants $J_1$ through $J_F$, as described above.

In accordance with process 1302, location server 214 constructs unrefined probability distributions $V_1$ through $V_F$ for instants $J_1$ through $J_F$ as follows:
  i. if $J_i$ corresponds to a particular $H_j$ only, then $V_i$ equals the non-GPS probability distribution at instant $H_j$,
  ii. if $J_i$ corresponds to a particular $G_k$ only, then $V_i$ equals the GPS probability distribution at instant $G_k$, and
  iii. otherwise ($C_i$ corresponds to both a particular $H_j$ and a particular $G_k$), $V_i$ equals a probability distribution that equals the normalized product of the non-GPS and GPS probability distributions at instant $J_i$.

In accordance with process 1303, location server 214 determines for each instant $J_i$, temporally-extrapolated probability distributions $D_{i,j}$ for all $j \neq i$, $1 \leq j \leq F$, which are based on (i) the unrefined probability distribution $V_j$ at instant $J_j$, (ii) $P_S(b, T, N, W)$, and (iii) $P_M(b, T, N, W, c)$. The extrapolated probability distribution $D_{i,j}$ is therefore a predictive probability distribution at instant $J_i$ that is based on empirical data at instant $J_j$—but not on any empirical data at other instants, including $J_i$.
  i. the past data for the movement of all wireless terminals; and
  ii. the past data for the movement of wireless terminal W; and
  iii. the location, speed, and acceleration of wireless terminal W at calendrical time T; and
  iv. the state of traffic signals that can affect the movement of wireless terminals in location b.

A temporally-extrapolated probability distribution can be progressed (i.e., projected into the future based on a past probability distribution). For example, if instant $J_3$ is one time step after instant $J_2$, then extrapolated probability distribution $D_{3,2}$ is derived by a single application of $P_S(b, T, N, W)$ and $P_M(b, T, N, W, c)$ to unrefined probability distribution $V_2$. In other words, for any location b:

$$D_{3,2}[b] = V_2[b] \cdot P_S(b, J_2, N, W) + \sum_{(c,b) \in in(b)} V_2[c] \cdot P_M(c, J_2, N, W, b) \quad \text{(Eq. 8)}$$

where in(b) is the set of arcs into location b from other locations in the adjacency graph. Similarly, a temporally-extrapolated probability distribution can be regressed (i.e., projected into the past based on a future unrefined probability distribution) based on the equation:

$$V_3[b] = D_{2,3}[b] \cdot P_S(b, J_2, N, W) + \sum_{(c,b) \in in(b)} D_{2,3}[c] \cdot P_M(c, J_2, N, W, b) \quad \text{(Eq. 9)}$$

by setting up a system of equations (9) for a plurality of locations $\{b_1, b_2, \ldots, b_n\}$ and solving for $\{D_{2,3}[b_1], D_{2,3}[b_2], \ldots, D_{2,3}[b_n]\}$ via matrix algebra.

As will be well-understood by those skilled in the art, after reading this disclosure, when consecutive instants are two or more time steps apart, then Equation 8 can be applied iteratively in well-known fashion. (Because the time step is atomic the number of iterations is always integral.) As will be further appreciated by those skilled in the art, after reading this disclosure, the extrapolated probability distributions for non-consecutive time instants (e.g., $D_{2,4}$, $D_{5,1}$, etc.) can be efficiently computed in a bottom-up fashion from the extrapolated probability distributions for consecutive time instants via dynamic programming.

In accordance with process 1304, location server 214 computes each refined probability distribution $L_i$, corresponding to each instant $J_i$, $1 \leq i \leq F$, as a weighted average of:
  i. the corresponding unrefined probability distribution $V_i$, and
  ii. all available temporally-extrapolated probability distributions $D_{i,j}$, $j \neq i$:

$$L_i = \frac{V_i + \sum_{j \neq i} [\alpha^{|j-i|} \cdot D_{i,j}]}{1 + \sum_{j \neq i} \alpha^{|j-i|}} \quad \text{(Eq. 10)}$$

wherein $\alpha$ is a constant, $0 < \alpha < 1$, that acts as an "aging factor" that weights less temporally-extrapolated probability distributions more heavily that more temporally-extrapolated probability distributions because of the more temporally-extrapolated probabilities distributions are less likely to be correct than the less temporally-extrapolated probability distributions. For example, when i=4 and F=5, Equation 10 in expanded form yields:

$$L_4 = \frac{V_4 + \alpha \cdot D_{4,3} + \alpha \cdot D_{4,5} + \alpha^2 \cdot D_{4,2} + \alpha^3 \cdot D_{4,1}}{1 + 2\alpha + \alpha^2 + \alpha^3} \quad \text{(Eq. 11)}$$

Defining $D_{i,i} = V_i$, Equation 10 can be expressed in a simpler form that is particularly convenient for computer processing:

$$L_i = \frac{\sum_{j=1}^{F} [\alpha^{|j-i|} \cdot D_{i,j}]}{\sum_{j=1}^{F} \alpha^{|j-i|}} \quad \text{(Eq. 12)}$$

In accordance with process 1305, location server 214 generates an estimate of the location of wireless terminal 201 at one or more instants $J_i$ based on the maximum likelihood function of $L_i$. (As will be appreciated by those skilled in the art, after reading this disclosure, in some other embodiments of the present invention an estimate might be generated from probability distribution $L_i$ using another function or method.)

In accordance with process 1306, location server 214 provides the estimate(s) of the location of wireless terminal 201 generated in process 1305 to location client 213, in well-known fashion.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
  receiving (i) a measurement of a first characteristic of a first signal that is processed by a wireless terminal and (ii) a measurement of the first characteristic of a second signal that is processed by the wireless terminal;
  designating at least one of a plurality of possible locations of the wireless terminal as improbable;
  estimating the location of the wireless terminal based on:
    (i) a comparison of the measurement of the first characteristic of the first signal to a predicted value of the first characteristic of the first signal, and
    (ii) a comparison of the measurement of the first characteristic of the second signal to a predicted value of the first characteristic of the second signal, for at least one of the plurality of possible locations not designated as improbable.

2. The method of claim 1 wherein designating at least one of the plurality of possible locations of the wireless terminal as improbable comprises:
  designating a possible location as improbable when a ranking of the measurement of the first characteristic of the first signal and the measurement of the first characteristic of the second signal differs from a ranking of the predicted value of the first characteristic of the first signal and the predicted value of the first characteristic of the second signal at the possible location.

3. The method of claim 1 wherein designating at least one of the plurality of possible locations of the wireless terminal as improbable comprises:
designating a possible location as improbable when a difference of the measurement of the first characteristic of the first signal and the predicted value of the first characteristic of the first signal exceeds a threshold.

4. The method of claim 1 wherein designating at least one of the plurality of possible locations of the wireless terminal as improbable comprises:
designating a possible location as improbable when the location is not provided wireless telecommunications service by a base station that is known to be providing service to the wireless terminal.

5. The method of claim 1 wherein designating at least one of the plurality of possible locations of the wireless terminal as improbable comprises:
designating a possible location as improbable when the location is not within the neighboring coverage area of a base station that is known to be a neighboring base station of the wireless terminal.

6. A method comprising:
receiving a measurement of a first characteristic of a first signal that is processed by a wireless terminal;
designating at least one of a plurality of possible locations of the wireless terminal as improbable; and
estimating the location of the wireless terminal based on a comparison of the measurement of the first characteristic of the first signal to a predicted value of the first characteristic of the first signal for at least one of the plurality of possible locations not designated as improbable;
wherein designating at least one of the plurality of possible locations of the wireless terminal as improbable comprises:
designating a possible location as improbable when a measurement of the first characteristic of a second signal is not received when it would have been received if the wireless terminal were, in fact, at that location.

7. A method comprising:
receiving (i) a measurement of a first characteristic of a first signal that is processed by the wireless terminal and (ii) an indication that a measurement of the first characteristic of a second signal is not received;
designating at least one of a plurality of possible locations of the wireless terminal as improbable; and
estimating the location of the wireless terminal based on a comparison of the measurement of the first characteristic of the first signal to a predicted value of the first characteristic of the first signal for at least one of the plurality of possible locations not designated as improbable;
wherein designating at least one of the plurality of possible locations of the wireless terminal as improbable comprises:
designating a possible location as improbable when the measurement of the first characteristic of the second signal is not received when it would have been received if the wireless terminal were, in fact, at that location.

8. A method comprising:
receiving (i) a measurement of a first characteristic of a first signal that is processed by the wireless terminal and (ii) an indication that a measurement of the first characteristic of a second signal is not received;
designating at least one of a plurality of possible locations of the wireless terminal as improbable; and
estimating the location of the wireless terminal based on a comparison of the measurement of the first characteristic of the first signal to a predicted value of the first characteristic of the first signal for at least one of a plurality of possible locations not designated as improbable;
wherein designating at least one of the plurality of possible locations of the wireless terminal as improbable comprises:
designating a possible location of the wireless terminal as improbable when that possible location is not provided wireless telecommunications service by a first base station that is known to be providing service to the wireless terminal; and
designating a possible location of the wireless terminal as improbable when the measurement of the first characteristic of the second signal is not received when it would have been received if the wireless terminal were, in fact, at that location.

9. The method of claim 8 further comprising:
designating a possible location as improbable when a ranking of the measurement of the first characteristic of the first signal and the measurement of the first characteristic of the second signal differs from a ranking of the predicted value of the first characteristic of the first signal and the predicted value of the first characteristic of the second signal at the possible location.

* * * * *